United States Patent [19]
Soavi

[11] Patent Number: 5,553,534
[45] Date of Patent: Sep. 10, 1996

[54] METHOD AND APPARATUS FOR THE EVACUATION, CONVEYANCE, COMPACTING AND DISCHARGE OF BULK MATERIALS, ESPECIALLY SHAVINGS AND SWARF

[75] Inventor: Fabio Soavi, Castelmaggiore, Italy

[73] Assignee: Trasportatori Govoni S.r.l., Cento, Italy

[21] Appl. No.: 278,978

[22] Filed: Jul. 21, 1994

Related U.S. Application Data

[63] Continuation of Ser. No. 613,652, filed as PCT/IT89/00035 May 10, 1989, abandoned.

[30] Foreign Application Priority Data

May 11, 1988 [IT] Italy .................................. 40072A/88

[51] Int. Cl.⁶ .............................. B30B 3/00; B65G 33/00
[52] U.S. Cl. ......................................... 100/145; 198/670
[58] Field of Search ........................ 198/550.1, 658, 198/670, 671; 100/117, 127, 145; 414/326

[56] References Cited

U.S. PATENT DOCUMENTS

| | | | |
|---|---|---|---|
| 2,236,407 | 3/1941 | Jones | 198/670 X |
| 3,212,624 | 10/1965 | Hess | 198/670 X |
| 3,341,280 | 9/1967 | Eolkin | 198/670 X |
| 3,587,450 | 6/1971 | Smith | 100/145 X |
| 4,109,966 | 8/1978 | Boyhont et al. | 198/671 X |
| 4,415,336 | 11/1983 | Stasi et al. | 100/145 X |
| 4,881,862 | 11/1989 | Dick | 198/670 X |
| 5,337,658 | 8/1994 | Bruke | 198/671 X |

FOREIGN PATENT DOCUMENTS 2806334  8/1978  Germany .

Primary Examiner—William E. Terrell
Assistant Examiner—Tuan Nguyen
Attorney, Agent, or Firm—Lowe, Price, LeBlanc & Becker

[57] ABSTRACT

An apparatus and method are provided for conveying, compacting, and discharging materials such as shavings or swarf in a continuous manner. The material to be compacted is received into a conveyor tube inside which is rotated a screw thread mounted on a shaft. The conveyor tube is formed to have at least one longitudinal passage open to the inside, so that the material being conveyed and compacted does not merely circulate around the outside of the screw thread but is enabled to move longitudinally in a forward direction with a braking effect to facilitate the compaction thereof. In one aspect of the invention, a ratio of the diameters of the outside of the screw thread and the shaft on which the screw thread is provided is less than 3 but not less than 1.

19 Claims, 20 Drawing Sheets

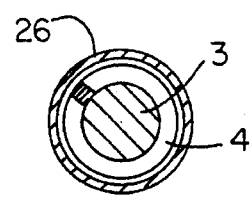
Fig. 15
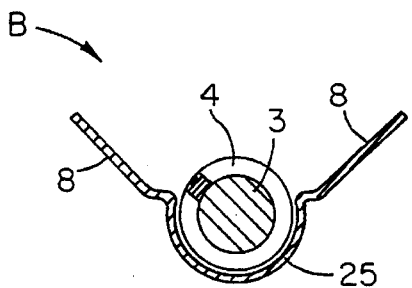
Fig. 14
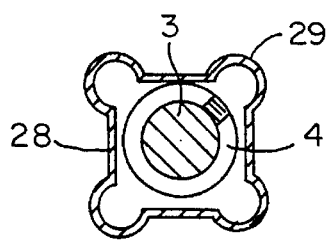
Fig. 17
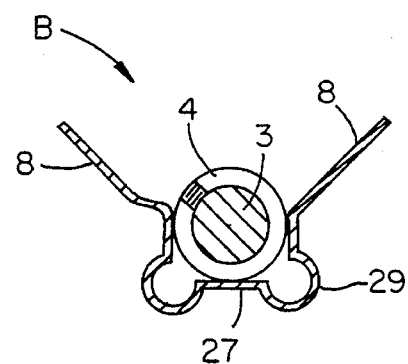
Fig. 16
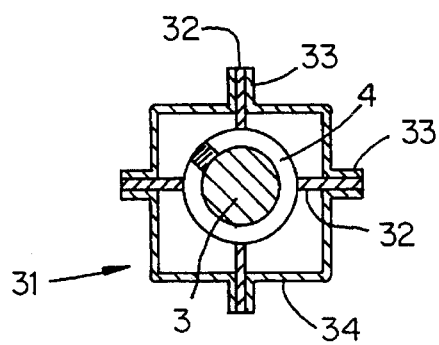
Fig. 19
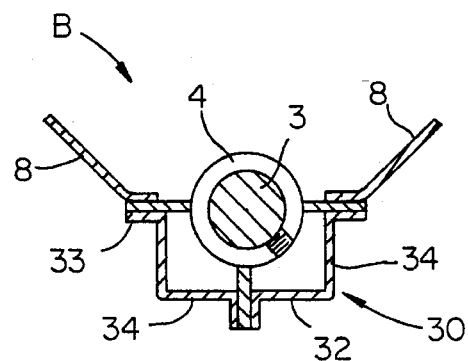
Fig. 18
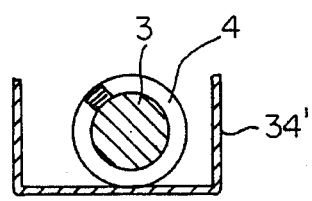
Fig. 19'
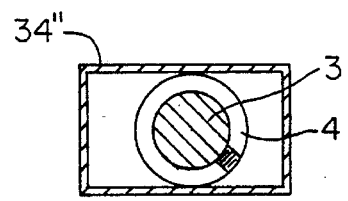
Fig. 19"

METHOD AND APPARATUS FOR THE EVACUATION, CONVEYANCE, COMPACTING AND DISCHARGE OF BULK MATERIALS, ESPECIALLY SHAVINGS AND SWARF

This application is a continuation of application Ser. No. 07/613,652, filed as PCT/IT89/00035, May 10, 1989, (now abandoned).

FIELD OF THE INVENTION

The invention relates to a method and apparatus for the evacuation, conveyance, compacting and discharge of bulk materials, especially shavings and swarf, for the collection and evacuation, from a workplace or a collection place, of loose solid materials such as metal swarf and shavings, small items, ceramics, wood, paper, plastics, sludges, manure, rubbish and any other tangled, incohesive, granular and powdery, or mixed, products requiring evacuation for transfer to storage, or to be recycled, transformed, destroyed or discharged.

BACKGROUND OF THE PRIOR ART

The prior art includes the evacuation of shavings, swarf and other loose solid materials by means of slatted conveyors, conveyor belts, intermittent scraper blades, alternate-operating pushers and screw-feeders with semi-cylindrical or cylindrical housing adhering to the screw. The system generally operates in a trench with infeed and discharge only by gravity, with transportation mainly in a horizontal or slightly inclined direction or, sometimes, in a vertical direction.

DE-A-2 806 334 teaches a screw conveyor for conveyance of shavings of a machine tool, comprising a screw eccentrically enclosed in a conveyor tube and driven by a motor imparting to the screw an intermittent rotation. At the inside of the conveyor tube longitudinal rails are provided in order to break up the shavings, thus preventing the entanglement of the shavings.

GB-A-2 056 399 teaches a system for conveying metal shavings comprising a trough inside which a feed screw is arranged. A lip extends parallel to, and the whole length of, the feed screw to prevent shavings from being wound around the feed screw and also to cut up any long shavings. The system includes a disintegrator followed by a second feed screw.

Furthermore, it is known from JP-Abstracts vol.9, No. 142 (M-388) (1865) a chip discharging apparatus wherein the chips are dropped into a cylindrical guide pipe and transported along the pipe by a revolving coil spring. The screw feeders according to DE-A-2 806 334 and GB-A-2 056 399 consists of screws offering a high ratio (e.g. greater than 3) between the external diameter and that of the shaft; moreover their threads are often of low thickness, of the order of a few millimeters for external diameters of for example 200 mm: thus their use is inevitably limited to the conveyance of shavings falling within the category of granular or powder materials well known to be suitable for conveyance by usual screw-feeders. If long metal shavings are to be conveyed, said screw feeders require means to break up the shavings which involve an additional motive power.

The discharging apparatus according to JP-Abstracts, vol.9, no. 142, makes use of a revolving coil spring as a conveyor. This kind of conveyor can not compact the shavings which maintain a high specific volume and require separate compacting devices.

All kinds of shavings, or materials in general, require an evacuation method appropriate to the different characteristics of the material.

During handling of shavings or materials in general by various conventional means, many problems may often arise: for example, long metal shavings easily form tangled masses when transported by means of a slatted conveyor, and the slats may be damaged by the entangled shavings and blockages and cause hold-ups in operation and wasted time.

Furthermore, it must be noted that transportation by means of slatted conveyors, in a horizontal or slightly inclined direction is the only option available for long metal shavings, since scraper blades and conventional screw feeders are unsuitable because said shavings tend to become entangled in the blades, and to wind round the screw without moving forward, thus blocking the feed of the material which follows. As to the use of a pusher for conveying long shavings, the efficiency level is too low since the system operates on a very high apparent specific volume in discontinuous mode.

Short shavings can be conveyed by scraper blades and pushers, even if with low efficiency and high time wastage, while in the case of granular or powdery shavings, as already mentioned, the conventional screw feeder can be used as a horizontal or, less frequently, vertical evacuation system.

In all cases, the material is collected at the end of the transportation phase in removable containers into which the materials fall by gravity: this is of extremely low efficiency for those materials, such as long shavings, having high apparent specific volume.

There is also a system for the transportation of metal shavings by means of a shaftless screw thread operating inside a basically semi-cylindrical housing: however, said system tends to have the problem of blocking caused by tangles and does not provide compacting of the material. In order to compact the material, the system must incorporate compactors comprising an alternating pusher whose sole function is pressing and not directly connected to the machine, but generally disposed at a distance therefrom; said pusher discharging the block or pad of shavings sideways in intermittent fashion.

The prior art stands in need of considerable improvements with regard to the possibility of identifying a method for evacuation of bulk materials which eliminates the problems described above and which enables the provision of a new evacuation machine capable of operating with a wide range of bulk materials, including the most problematical, and which is capable of being used individually for reception, evacuation, conveying and initial compacting, but is also suitable for use in association with other equipment and/or with a number of conveyor elements, including screw feeder, also providing compacting, in order to constitute a plant for conveying materials in a wide range of directions (including vertical climbs or routing at any incline), for chopping, compacting (including in blocks), collection in containers and pressing in the case of metal shavings or other materials containing liquids, such as machine tool coolants, in order to separate the components from each other.

From the above there derives the need to solve the technical problem of finding a new method of conveying bulk materials which provides the continuous feed of the same under pressure, even in the case of long, thin, ductile, tangled and/or loose metal shavings which are difficult to convey, reducing the apparent specific volume of said materials significantly to allow their continual, compacted transfer from the production or initial free collection zone, along routes leading in any direction, to the storage, transformation, destruction or discharge point. This method is required to provide a new type of evacuation machine capable of injecting the material, even of heterogeneous nature, after an initial compacting, into compacting containers, or of conveying the same along conveyor elements to a plant for its final collection, in a suitably compacted state, in containers into which the material enters by gravity fall, or in blocks. Where necessary, it must also be possible for the material to be transferred from the conveyor outlet into a container which may be located higher than said conveyor outlet.

The invention solves the above technical problem by adopting a method which involves the infeed of the bulk material onto a continuous screw conveyor exhibiting an advantageously low ratio between the external diameter of the threads and the diameter of the shaft, one or more longitudinal paths open towards the screw thread being provided outside a cylinder tangent to the screw thread, said paths being provided in order to prevent the bulk material from adopting a path around the circumference of the screw without moving forward and, at the same time, to allow the material to be compacted and to be fed onwards in a direction parallel to the screw axis.

SUMMARY OF THE INVENTION

The apparatus implementing the method comprises a screw conveyor divided into three parts: a first or rear section for transmission of rotational motion, a second or middle section for reception and evacuation of materials and a third or front section—if required—for conveyance, compacting and discharge. A first screw housing section, basically protective, is provided in the first section of the conveyor.

A second screw housing section open at the top and fitted with two diverging sidepieces is provided in the middle section of the conveyor wherein the material for evacuation is received.

The second screw housing section acts as a container of the screw and is in operational contact with the screw at least along a longitudinal line, whilst being clearly distanced, in one or more zones from a cylinder tangent to the screw thread, in order to provide one or more longitudinal paths outside said cylinder. The longitudinal paths are defined by a second housing cross-section with a varying dimension in a peripheral direction (i.e., the dimension from the longitudinal axis of the screw to the inner wall of the housing which forms a periphery of the longitudinal path).

A third screw housing section is provided in the third section of the conveyor. Said third housing section has a continuous cross-section at the top tangent to the screw thread and exhibiting at least one area in which it is clearly distances from the screw thread; the location of said area depends upon the direction of rotation of the screw and may be suitably provided in the first quadrant for lefthanded screws with clockwise rotation.

The bottom portion of said third housing section has the same shape as the corresponding portion of the second housing section in order to constitute a continuation of the latter.

The front part of the third housing section is connected at the top to the second housing section to make easier the introduction and distribution of the material into the discharge section.

In practice, it is found to be advantageous to incline the screw axis slightly forward and down in order to prevent wear of the housing, resting the lower part of the screw's front end on a hardened support element.

The following are two examples showing the specifications of two screws successfully tested for long, tangled and mixed shavings.

EXAMPLE 1 shaft diameter 45 mm;
thread constructed by winding round and welding of rod having section 12×12 mm, obtaining an external diameter of 69 mm;
pitch from 35 to 70 mm (with the lowest values used above all in conveyors positioned vertically or at a large angle to the horizontal).

EXAMPLE 2 shaft diameter 90 mm;
thread constructed by winding round and welding of rod having section 30 (radial)×25 mm, obtaining an external diameter of 150 mm;
pitch from 50 to 130 mm.

Note that the ratios between the external diameter and the shaft are 1.53 and 1.64 respectively, i.e., substantially one-half of the ratio adopted in conventional screw feeders; for a given external diameter, the thread thickness in the screw according to the invention is many times, even ten or more times, greater than that in a conventional screw conveyor.

The special morphology of the screw according to the invention, having a limited radial depth, combined with the concept of the housing having a cross-section including at least one zone clearly distanced from the perimeter of the screw, in order to allow material to flow and to be compacted, constitutes the first characterizing feature of the invention.

Depending on the axial length of the screw and the type of material to be conveyed, the shaft of the screw may be integral with the screw. Alternatively, the screw may be rotatably mounted on a longitudinal cylindrical element and powered from its rear end. Furthermore, said longitudinal cylindrical element may be of the hollow type in order to accomodate a drive shaft equipped with end flanges connected to the front or rear end of the screw.

The apparatus includes collection containers, with or without lids, which can be transported and tipped up, designed to be filled with material coming from the outlet of an evacuator or conveyor element: said outlet being inserted in a hole made in a side, in the front or in the base of said container; means being provided to shut off said hole. The material leaving the evacuator outlet is further compacted inside the container because of the effect of the sides and lid (if any) of the container; means being provided in order to drain off through the bottom of the container the liquid contained in the material, if any. Moreover, if the screw housing is inclined forward and downward, it is higly advantageous to discharge said liquid through openings made in the second section of the screw housing above the horizontal plane passing through the screw axis, in order to prevent blockage of said openings; the outlet of the discharge section of the conveyor being equipped with a baffle designed to direct shavings upwards and to prevent said liquid from flowing forwards instead of being discharged through said openings.

The apparatus also includes compacting devices which can be connected in series with the evacuator and conveyor outlet, in order to obtain high degrees of compacting. The cross section of said compacting devices may be the same as the cross section of the discharge section of the conveyor.

A first compacting device consists of a length of tubular element including a conveyor screw having a conical shaft tapered towards the inlet of the compacting devices.

A second compacting device consists of a length of tubular element tapered towards the outlet of the device; said tubular element including a conical conveyor screw.

A third and fourth compacting device are designed to compress in blocks the material discharged at the outlet of the conveyor.

The third compacting device consists of a length of tubular element equipped with an alternating shut-off device at its outlet.

The fourth compacting device consists of a cartridge slidable with alternating longitudinal motion on the outer surface of the end portion of the third housing section of the conveyor; said cartridge being equipped with a block extractor.

When the material is to be transported for some distance, the apparatus comprises two or more conveyor elements, whether or not equipped with compacting devices, connected with each other by means of angled connections. Each conveyor element may be independently driven or may be driven by the preceding element by means of an appropriate joint.

The advantages obtained by this invention are: continuous conveyance of any type of bulk material; reduction of apparent specific volume; compacting to the various degrees required; filling, with compacting, of containers which can also be coupled to the bases of machine tools, by injection of materials through the sides, fronts or bottoms of said containers; recovery of lubricating and coolant liquids; conveyors routed in systems, with full choice of directions, with possibility of vertical climbs, above or below ground level; reduction of plant dimensions; chopping; and reduction of investment and running costs.

BRIEF DESCRIPTION OF THE DRAWING

A number of ways of implementing the invention are illustrated, solely as examples, in the twenty drawings enclosed, in which:

FIGS. 14 and 15 are the cross sections of the reception-evacuation section and the transfer section, respectively, in an evacuator having circular conveyor section;

FIGS. 16 and 17 refer, similarly, to a conveyor system having four-lobed square section;

FIGS. 18 and 19 refer to conveyor system with square section and having a center-line diaphragm;

FIGS. 19' and 19" refer to conveyor systems with open-topped U-section and rectangular section, including with eccentrically-located screw, respectively;

DETAILED DESCRIPTION OF THE PREFERRED EMBODIMENTS

Figure 1:
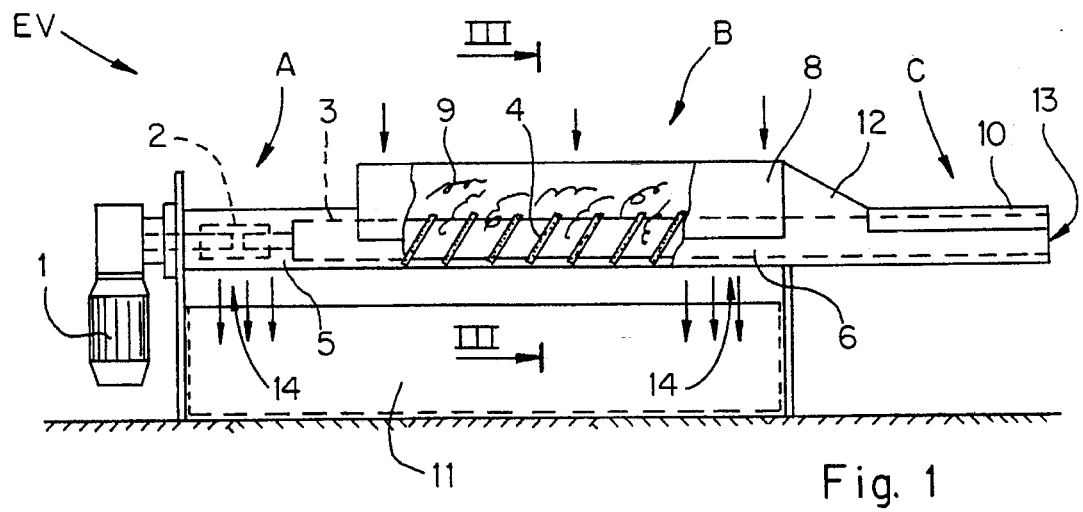
FIG. 1 is a side view, partially sectioned, of an evacuator constructed in accordance with a preferred embodiment of the invention, having asymmetrical T conveyor section.
Figure 2:
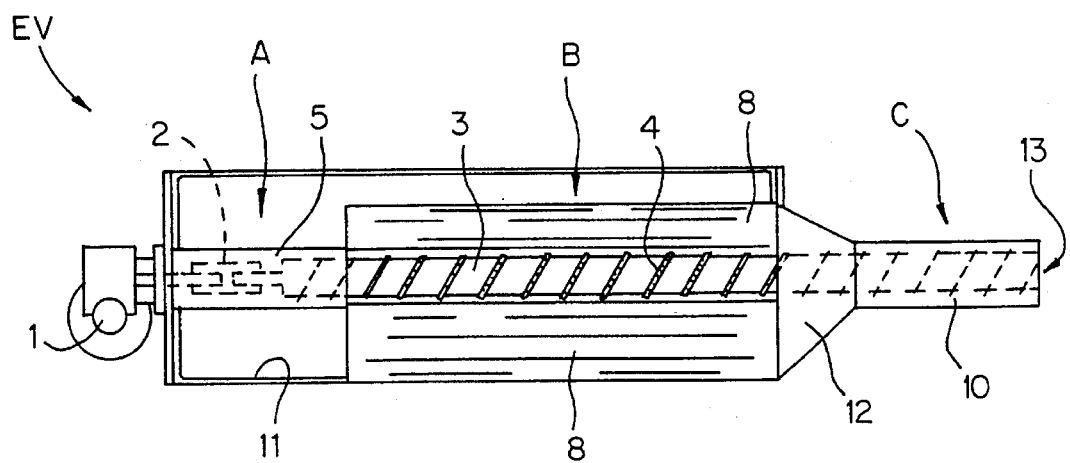
FIG. 2 is FIG. 1 viewed from above.

In the drawings: A indicates the rear or drive section of the screw conveyor EV, B the intermediate section of the conveyor for reception and evacuation of the material and C the front section of the conveyor for compacting and discharging the material. 1 indicates a geared or hydraulic or pneumatic motor, driving, by means of a joint 2, the shaft 3 of the conveyor screw having one or more peripheral threads 4: the direction of rotation of the shaft 3 is opposite to the winding direction the thread 4.

The thread 4 has a suitably square or rectangular cross section. The ratio between the diameter of the shaft and the diameter of the thread is conveniently high, for instance between 1.53 to 1 and 1.54 to 1. The pitch of the thread depends on the conveying speed and on the degree of compaction to be achieved. 5 is a tubular element providing the joint 2 with protection and stiffening; said tubular element constituting the first screw housing section. 6 is the lower part of the second screw housing section, having rectangular cross section with stiffening wings 7; said wings supporting the pair of sides 8 designed to receive the material 9 (e.g., shavings) entering from above; the screw 4 being centered in said rectangular section. 10 is a longitudinal element having a widened U-shaped cross section; said element being fixed, in asymmetrical cross position, on the pair of wings 7; said element, constituting the upper portion of the third screw housing section, being tangent to upper generatrix of the screw thread 4 in order to provide, if appropriate, effective centering of shaft 3.

Figure 3:
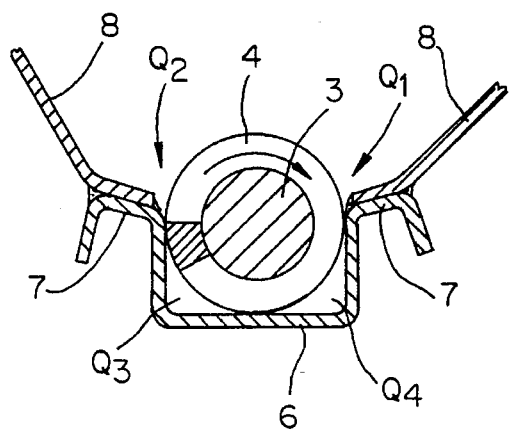
FIG. 3 is the vertical cross section of FIG. 1, enlarged, at section III—III, in the reception and evacuation section, open at the top.
Figure 4:
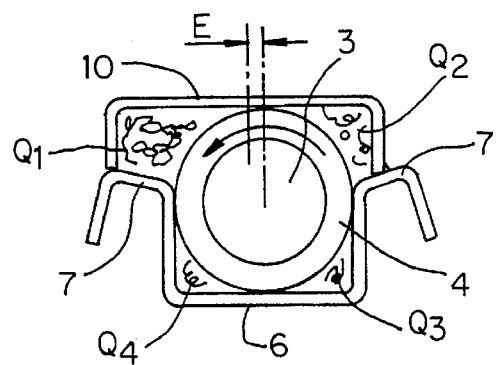
FIG. 4 is an enlarged view of only the outlet of FIG. 1, seen from the right.

The asymmetrical position of the longitudinal element 10 with respect of the wings 7 makes broader the section of the material outflow in correlation with the direction of rotation of the screw, in order to ensure increased flow-rate— especially in the case of free-flowing shavings—in the first quadrant Q1 (FIGS. 3, 4); the cross section of the third screw housing section is thus shaped as an asymmetrical T (note that a corresponding material flow path is provided in each of the quadrants Q1, Q2, Q3 and Q4 and that these flow paths are defined by a housing cross-section with a non-constant (i.e., varying) dimension from the longitudinal axis of the screw to the inner peripheral wall of the housing which forms a periphery of the longitudinal path). 11 is a tank for collecting the lubricating-coolant fluid located near to a machine tool if the system is installed for evacuation of metal shavings from said machine tool.

12 is an upper funneling element which connects the sides 8 of the second screw housing section to the longitudinal element 10, in order to facilitate the entry of the the material 9 into the discharge section C.

13 is the outlet of the discharge section C and 14 are are slots made in the lower portion of the tubular element 5 and the lower part 6 of the second screw housing section for drainage of lubricating-coolant fluid or other liquids: said drainage being possible when the features of the shavings are such as not to block the slots 14.

Figure 5:
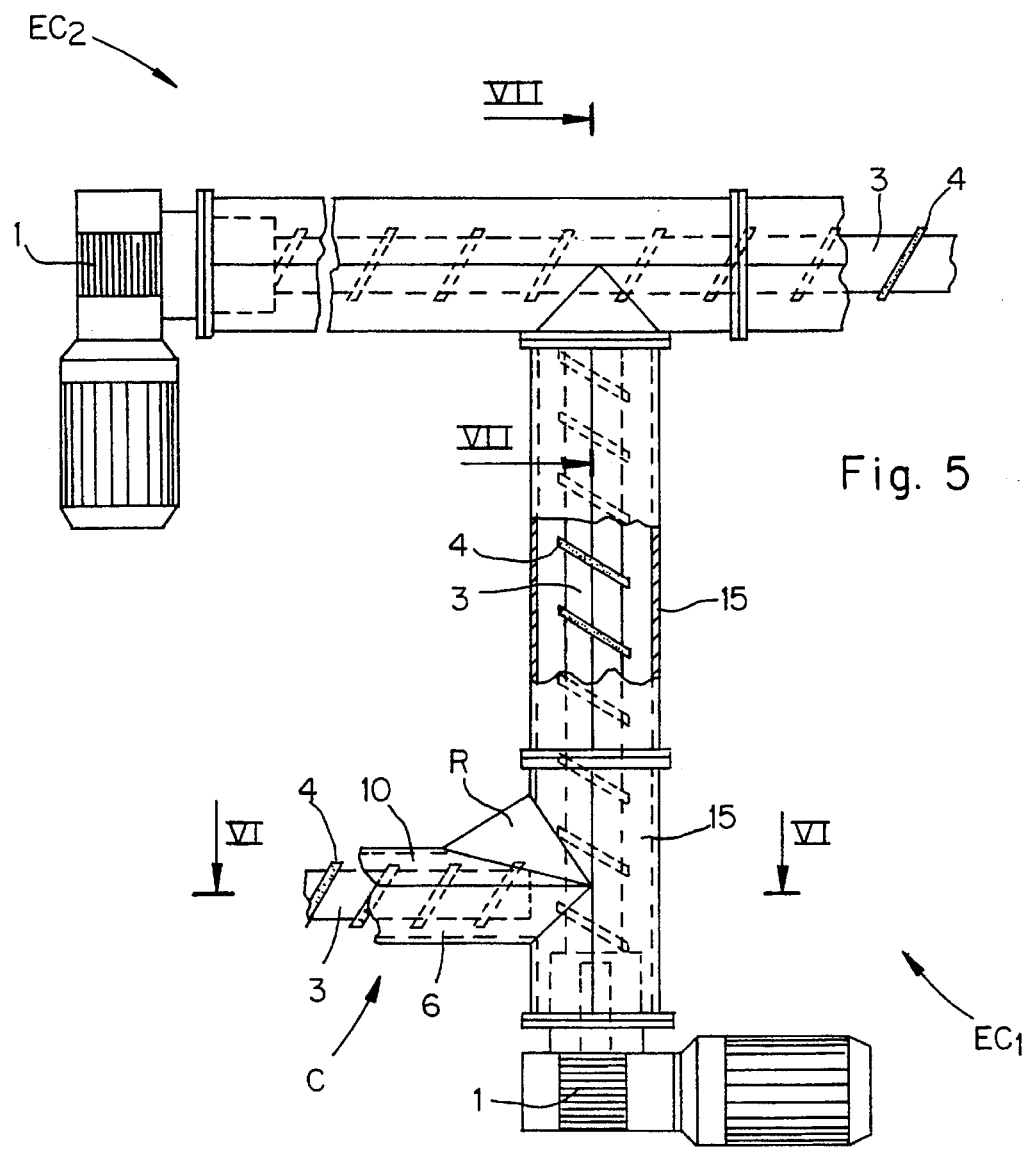
FIG. 5 is the side view, interrupted and partially sectioned, of a length of conveyor system coordinated with the evacuator illustrated in FIGS. 1 to 4.
Figure 6:
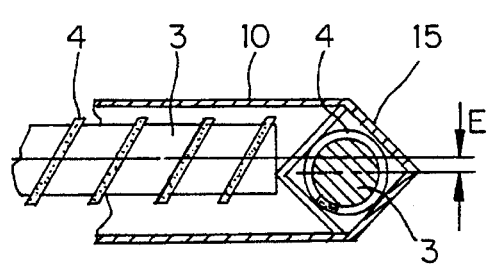
FIG. 6 is the horizontal section VI—VI of a right-angle transmission in transfer from the evacuator to a conveyor element.
Figure 7:
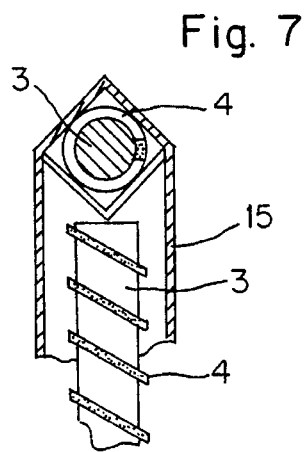
FIG. 7 is the vertical section VII—VII of FIG. 5, relating to a further right-angle conveyor element.
Figure 8:
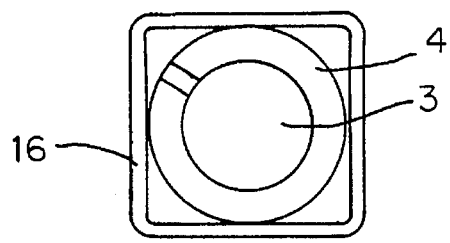
FIG. 8 is a view from the righthand side of the outlet of an evacuator having basically square conveyor section.

EC1 (FIG. 5) is a conveyor element comprising a motor 1 driving a shaft 3 fitted with screw 4, which is centered within a tubular a tubular element 15 having a square cross section: said tubular element being connected at right angles to the discharge outlet of the section C of an evacuator EV; the sides of the tubular element 15 make an angle of 45° with a first vertical plane containing the axis of the screw of the evacuator EV; said vertical plane being parallel to a second vertical plane containing the axis of the tubular element 15: E denotes the distance between said first and second vertical planes.

Figure 9:
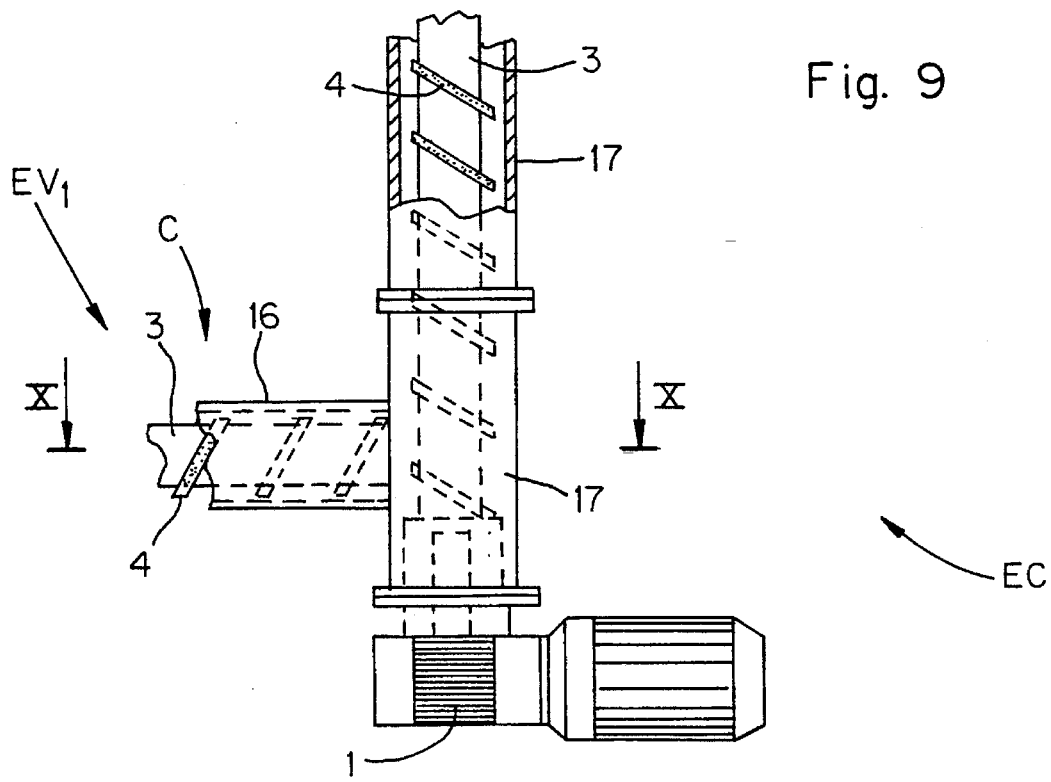
FIG. 9 is a side view, interrupted and partially sectioned, of a section of conveyor plant coordinated with an evacuator having conveyor with square cross section.
Figure 10:
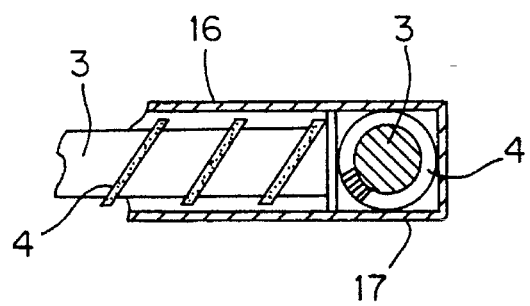
FIG. 10 is the horizontal section X—X of FIG. 9 relating to a right-angle transmission in transfer from the evacuator to a conveyor element.
Figure 11:
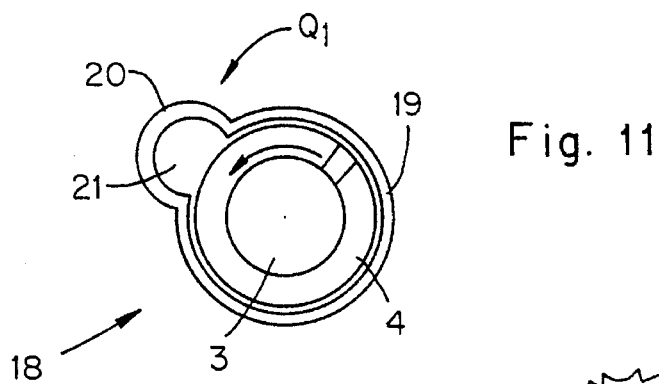
FIG. 11 is a view from the righthand side of the outlet of an evacuator having conveyor with lobed circular section.

EC2 is a further conveyor element connected at right angles to the conveyor element EC1; R is a connecting element (if required) between the longitudinal element 10 of the evacuator EV and the tubular element 15 of the conveyor element EC1; 16 (FIG. 9) is a square-section longitudinal tubular element constituting the end part C of the evacuator EV1, connected at right angles to the square-section tubular element 17 of a conveyor element EC: the sides of the square section of said element 17 are parallel to the corresponding sides of the square section of said tubular element 16.

Figure 12:
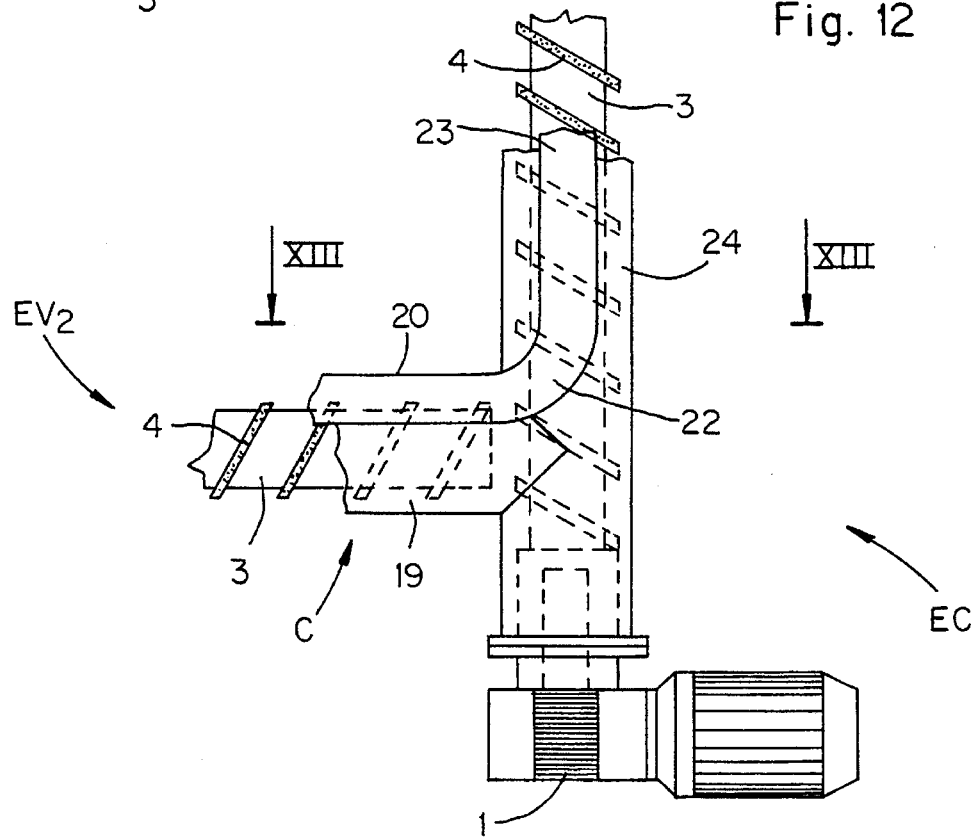
FIG. 12 is the side view, interrupted and partially sectioned, of a length of a conveyor plant coordinated with an evacuator having lobed circular cross section.
Figure 13:
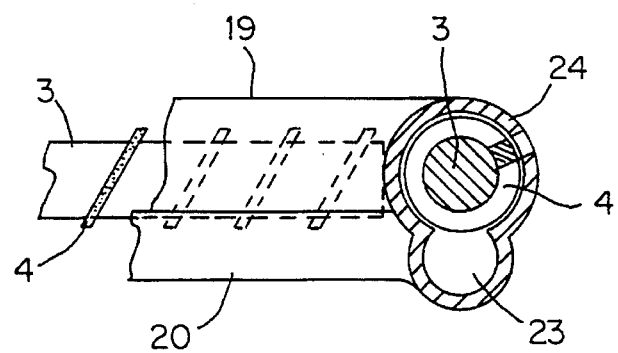
FIG. 13 is the section XIII—XIII of FIG. 12, relating to a right-angled transmission in the transfer from the evacuator to a conveyor element.

EV2 is an evacuator comprising a tubular element 19 having a circular cross section with a lobed appendix 20 in the quadrant Q1: said lobed appendix increases the flow section of the material in correlation with the thread rotation defining a straight channel or discharge route 21; 22 (FIG. 12) is the elbow union between said straight channel of the evacuator EV2 and a corresponding straight channel 23 of a tubular element 24 having cross section corresponding to that of the tubular element 19, the tubular element 24 being connected at right angles to the tubular element 19.

25 (FIG. 14) denotes the lower portion of a second screw housing section having incomplete circular cross section containing the screw in the intermediate section B of an evacuator; 26 (FIG. 15) is a third screw housing section having circular cross section in the front part C of the evacuator.

Other shapes of the second and third screw housing sections are illustrated in FIGS. 16 to 27. It should be noted that these housing cross-sections define flow paths and are non-constant in a peripheral dimension.

FIGS. 16, 18, 19', 20, 22, 24 and 26 illustrate the shape of the cross section of a number of embodiments of the second screw housing section, whilst FIGS. 17, 19, 19", 21, 23, 25 and 27 illustrate the shape of the cross section of the corresponding third screw housing sections.

Figure 20:
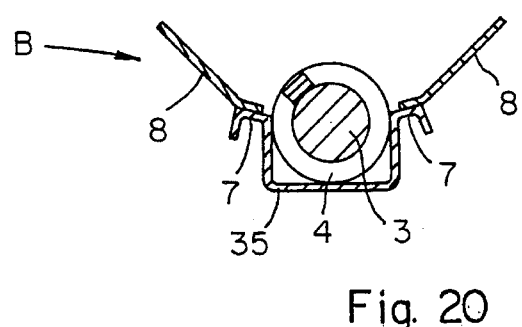
FIGS. 20 and 21 refer to conveyor systems with section rectangular in the lower part and having slanted upper sides.
Figure 22:
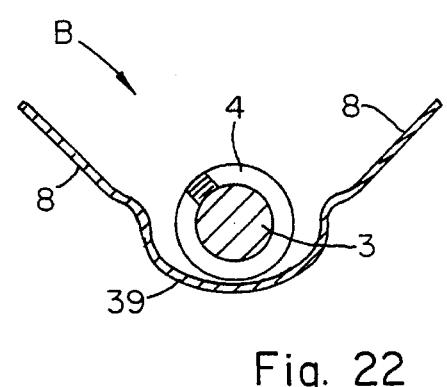
FIGS. 22 and 23 refer to an oval-section conveyor system.
Figure 24:
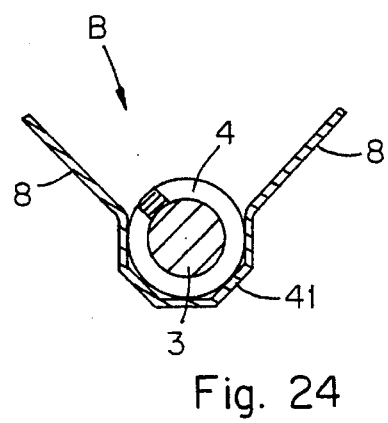
FIGS. 24 and 25 refer to a conveyor system with upper polygonal section having four sides.
Figure 26:
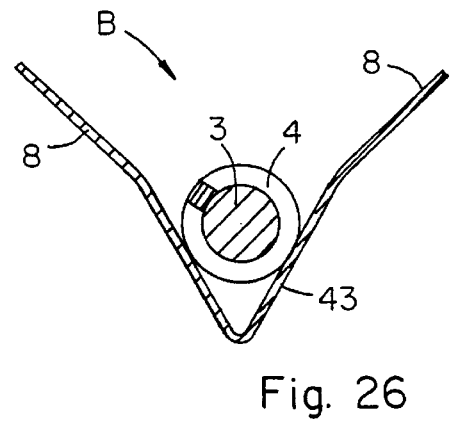
FIGS. 26 and 27 refer to a conveyor system having triangular section.
Figure 27:
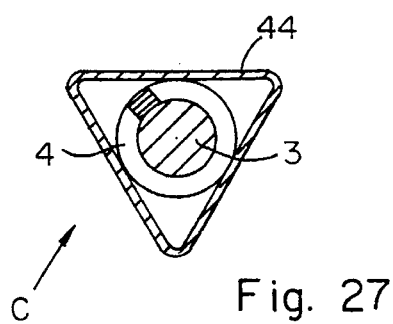

According to the above mentioned figures, the second screw housing section may have the following cross sections:

a U-shaped section 27, with two lobes 28 and diverging upper sides 8;

a U-shaped section 30, with diverging upper sides 8 and centering diaphragms 32 (FIG. 18); said diaphragms being fixed between pairs of edges 33 of angular longitudinal elements 34 constituting the lower portion of the screw housing;

a U-shaped section 34', wherein the screw 3, 4 is installed in eccentric position (FIG. 19');

a U-shaped section 35 with stiffening wings 7 and diverging sides 8 (FIG. 20);

an oval section 39 with diverging upper sides 8 (FIG. 22);

a polygonal section 41 with diverging upper sides 8 (FIG. 24);

a V-shaped section 43 with diverging upper sides 8 (FIG. 26).

Figure 21:
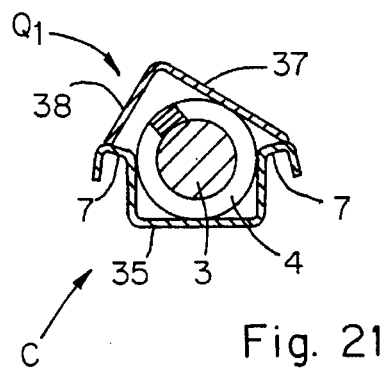
Figure 23:
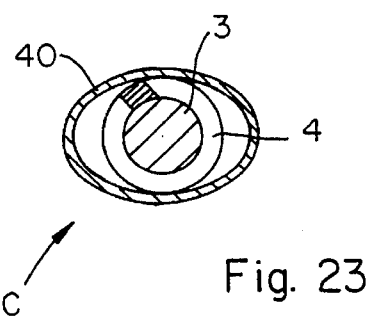
Figure 25:
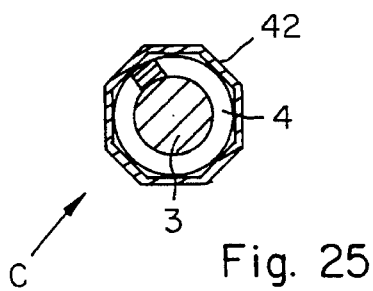

Correspondingly, the third screw housing section may have the following cross sections:

a square section 28, with four lobes 29 (FIG. 17);

a square section with four centering diaphragms 32; said diaphragms being fixed between the edges 33 of four longitudinal elements 34, constituting the screew housing (FIG. 19);

a rectangular section 34", wherein the screw 3, 4 is installed in eccentric position (FIG. 19");

a polygonal section having a U-shaped lower part 35 with wings 7 and an asimmetric triangular upper part 34, 38 (FIG. 21);

an oval section 40 (FIG. 23);

a polygonal section 42 (FIG. 25);

a triangular section 44.

Figure 28:
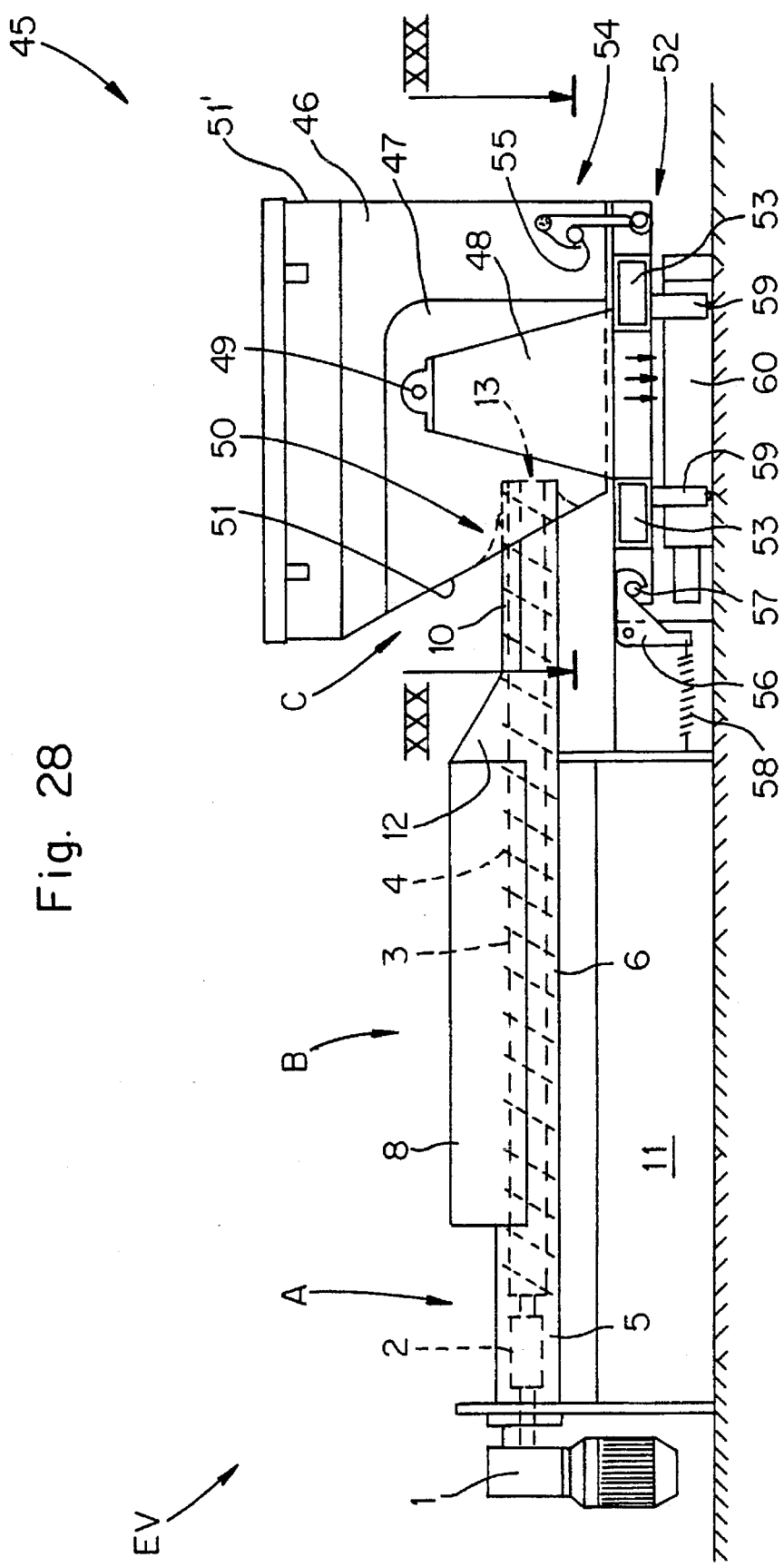
FIG. 28 is a side view of an evacuator which transfer the shavings to a container, being inserted into the front of it.

FIG. 28 illustrates a movable container 45, which may be closed at the top, the container being designed to receive and compact the material coming from the evacuator.

46 designates the sides of the container 45 equipped with housing 47 accomodating the supports 48 of the container. The container is connected to said supports by means of hinge pins 49, 50 and designates an opening made in the front wall 51 of the container 45 accomodating the evacuator outlet 13; said opening being equipped with a flexible star-diaphragm. 51' is the rear wall of the container. 52 designates the base of the container equipped with four way openings 53 to receive the forks of a lift-truck. 54 is a pair of adjustable hooks provided in the rear of the base 52, said hooks may be coupled to side pins 55 provided in the sides 46 of the container.

Figure 29:
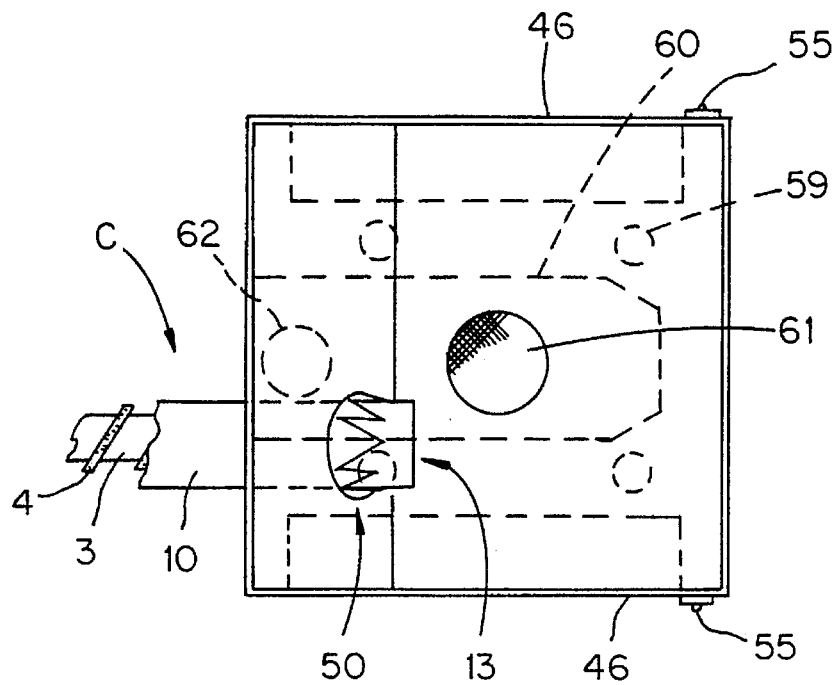
FIG. 29 is a view from above of the station of the container in FIG. 28, referred to the base of the machine tool.
Figure 30:
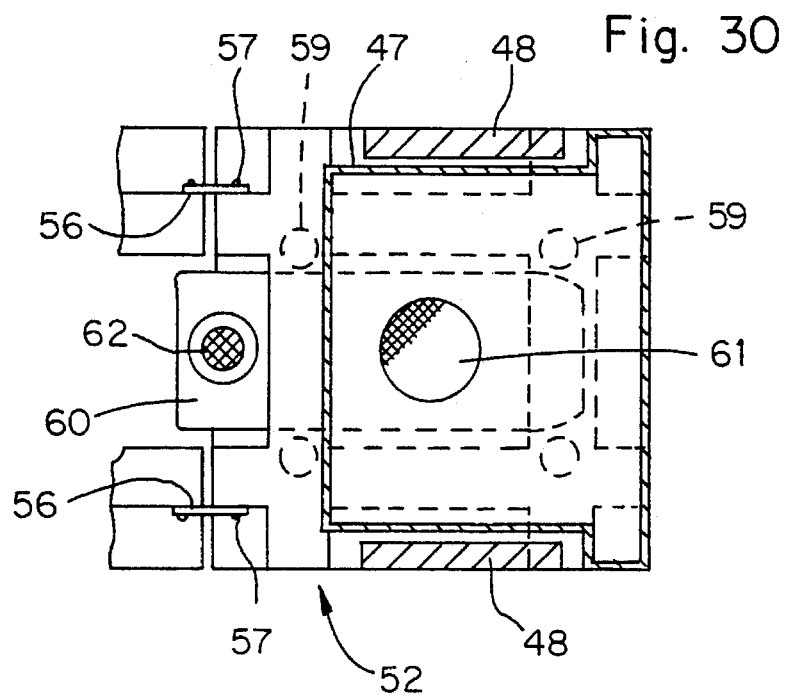
FIG. 30 is the horizontal section XXX—XXX of FIG. 28.

56 indicates a second pair of adjustable hooks connected to the base of the evacuator by means of coil springs 58. Said hooks are designed to be coupled with side pins 57 provided in the base of the container. 59 are the wheels of the base of the container. 60 is a tank or reservoir for collection of lubricating and coolant liquid discharged from the container by means of a filter 61 (FIG. 29) mounted in the bottom of the container (the sides of said tank, connected to the base of the evacuator, are used to guide the wheels 59, in order to facilitate the insertion of the evacuator outlet 13 into the opening 50.

Figure 31:
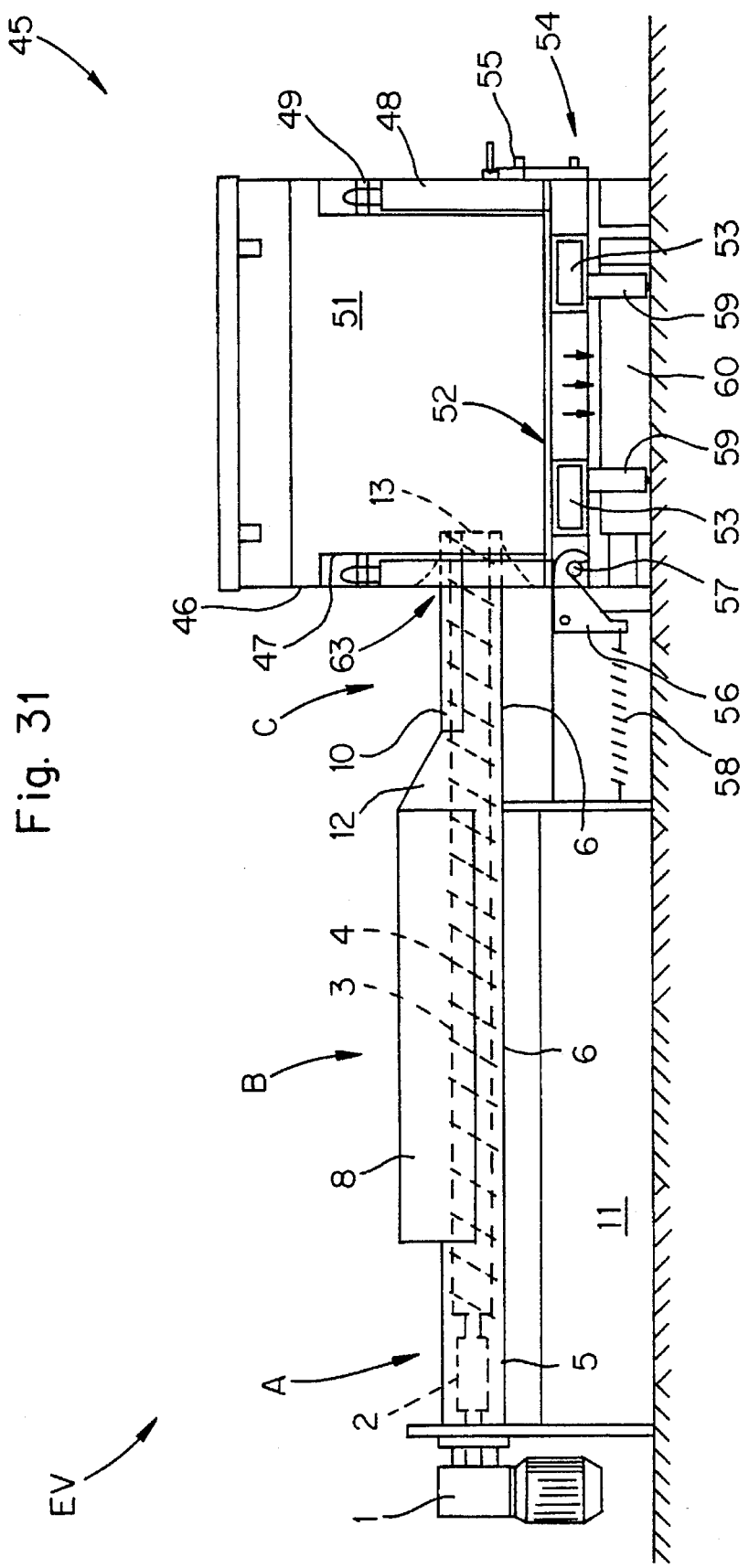
FIG. 31, is the side view of an evacuator which transfers material to the container shown in FIG. 28, being inserted in the side of the same.
Figure 32:
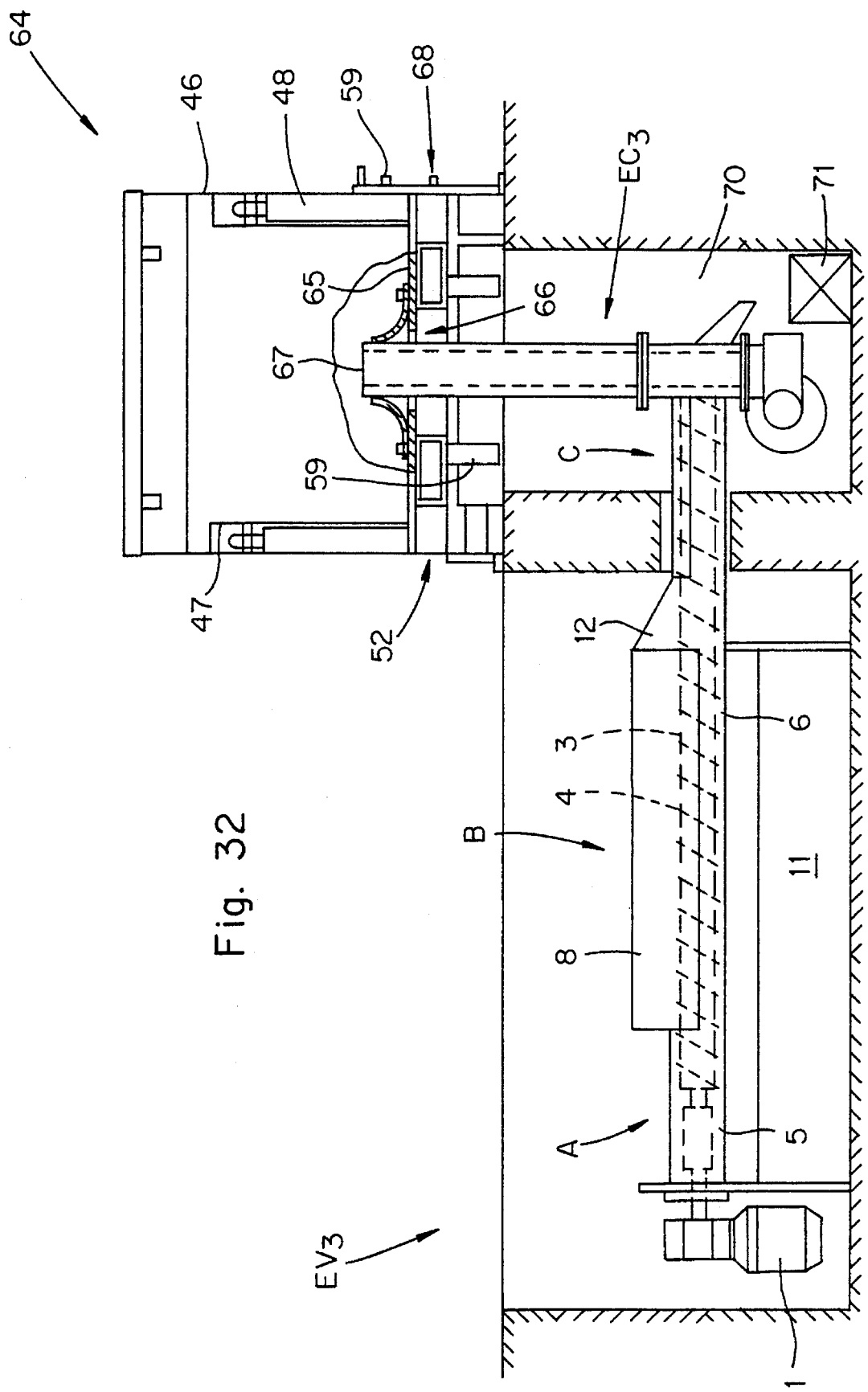
FIG. 32 is a side view of a trench-installed evacuator with right angle-transmission to a vertical conveyor transferring material to the same container shown in FIGS. 28 and 31, with insertion in the bottom of the same.

62 designates a motor-pump unit connected to the tank 60 to convey said liquid to the tank 11; 63 (FIG. 31) is an opening in a side 46 of the container 45 designed to receive the evacuator outlet 13. 64 (FIG. 32) is a further tip-up container, fitted with base 65 incorporating a hole 66 into which the outlet 67 of a conveyor element EC3 may be inserted. Said conveyor element EC3 being connected at right angles to a trench-installed evacuator EV3. 68 is a pair of adjustable hooks, floor-mounted, which may be coupled with pegs 69 projecting from the sides 46 of the container 45; 70 is a trench, equipped with tank 71 for collection of the lubricating-coolant liquid draining from an opening in the lower part of the conveyor element EC3.

Figure 33:
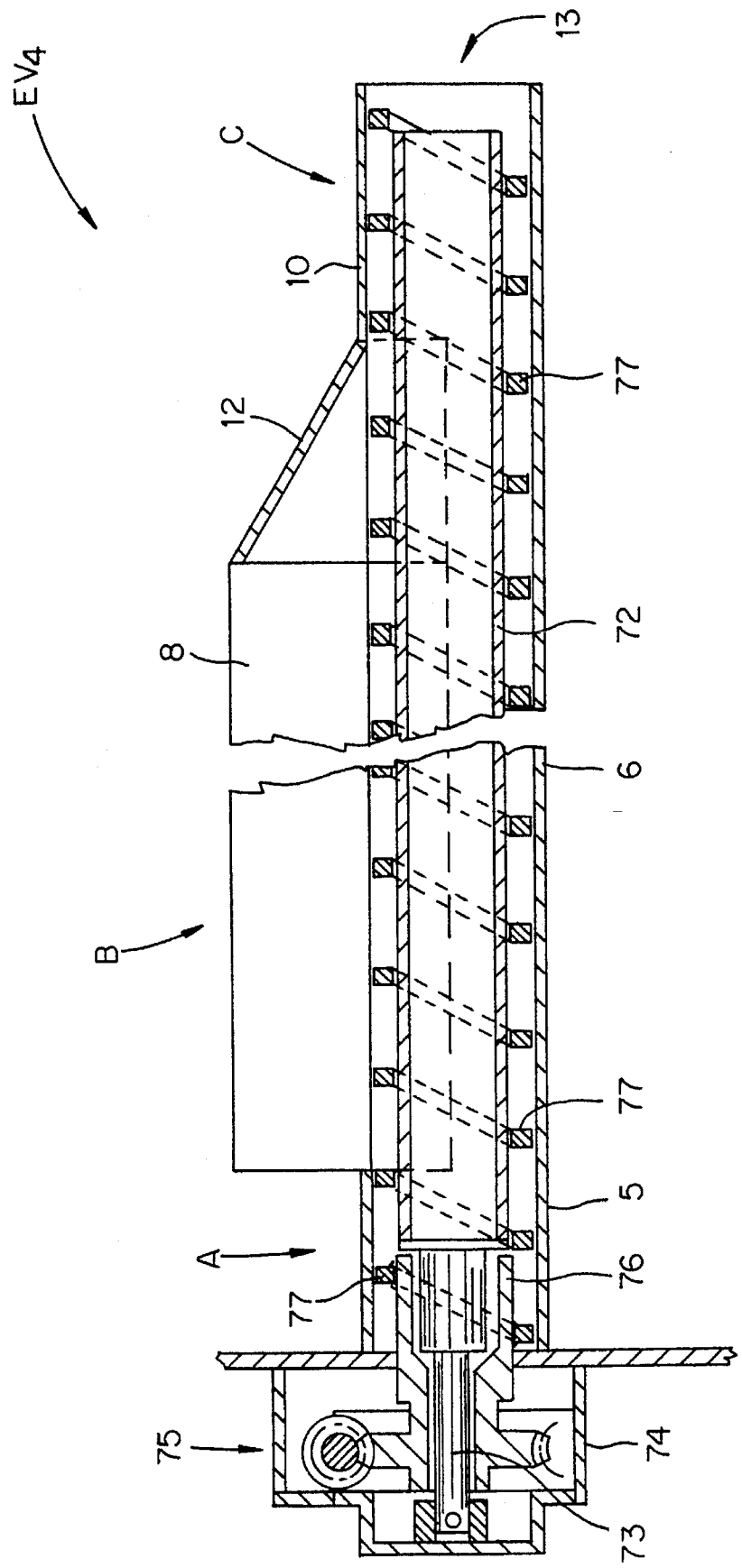
FIG. 33 is a vertical longitudinal section of a screw thread provided with powered movement in relation to an internal coaxial cylindrical core.

72 (FIG. 33) designates a longitudinal element of an evacuator EV4, having circular cross section: the rear end 73 of the evacuator EV4 is articulated to a support frame 74.

75 is a drive transmission equipped with a horizontal shelf 766 external and coaxial to said rear end 73.

Shelf 76 supports the rear end of a reception/evacuation and conveyor screw, rotatably coupled to said element 72 section longitudinal element and centered into the first, second and third screw housing sections.

Figure 34:
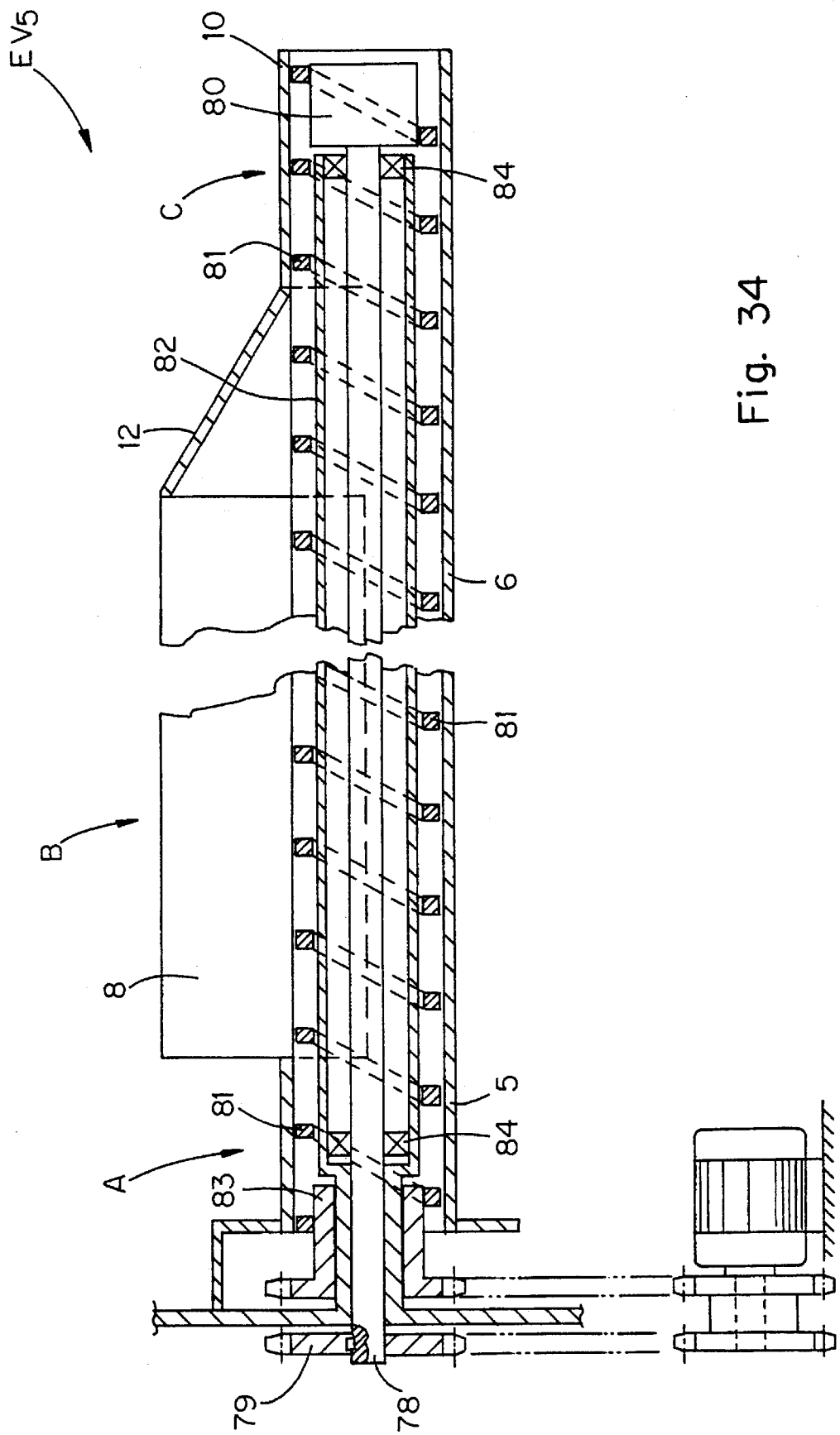
FIG. 34 is a section similar to that in FIG. 33, having a thread driven from both ends.

78 (FIG. 34) is the shaft of an evacuator EV5 powered by a gear 79; to the front end of said shaft is keyed a cylindrical appendix 80 of greater diameter; the front end of a screw 81, rotatably coupled with a tubular longitudinal element 82, is fixed to said appendix 80; the element 82 being coaxial and external to the shaft 78. The rear end of the screw 81 is fixed to the hub of a gear wheel 83 synchronous with the gear 79.

Figure 35:
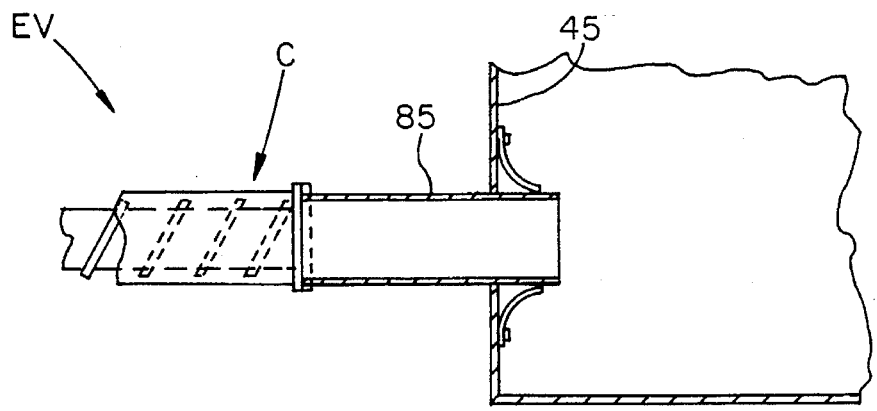
FIG. 35 is the longitudinal vertical section of a compacting element which can be fitted to the end of the evacuator, comprising a cylindrical of tapered tubular element.
Figure 36:
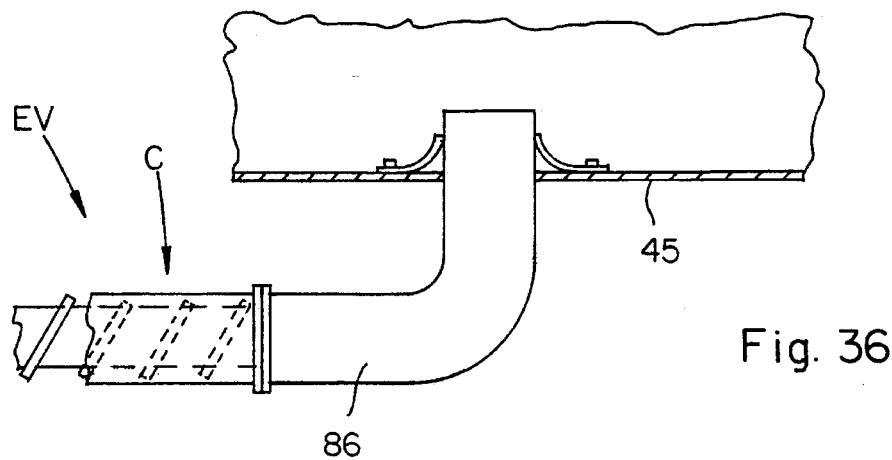
FIG. 36 is the longitudinal vertical section of an elbow-type tubular compacting element with an outlet pointing upwards.
Figure 37:
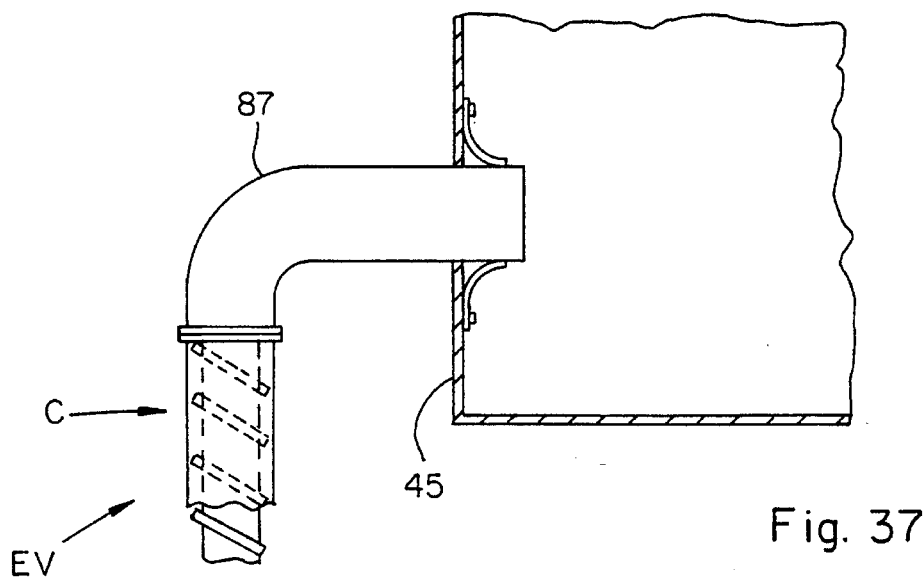
FIG. 37 is the longitudinal vertical section of an elbow-type tubular compacting element with an horizontal outlet.
Figure 38:
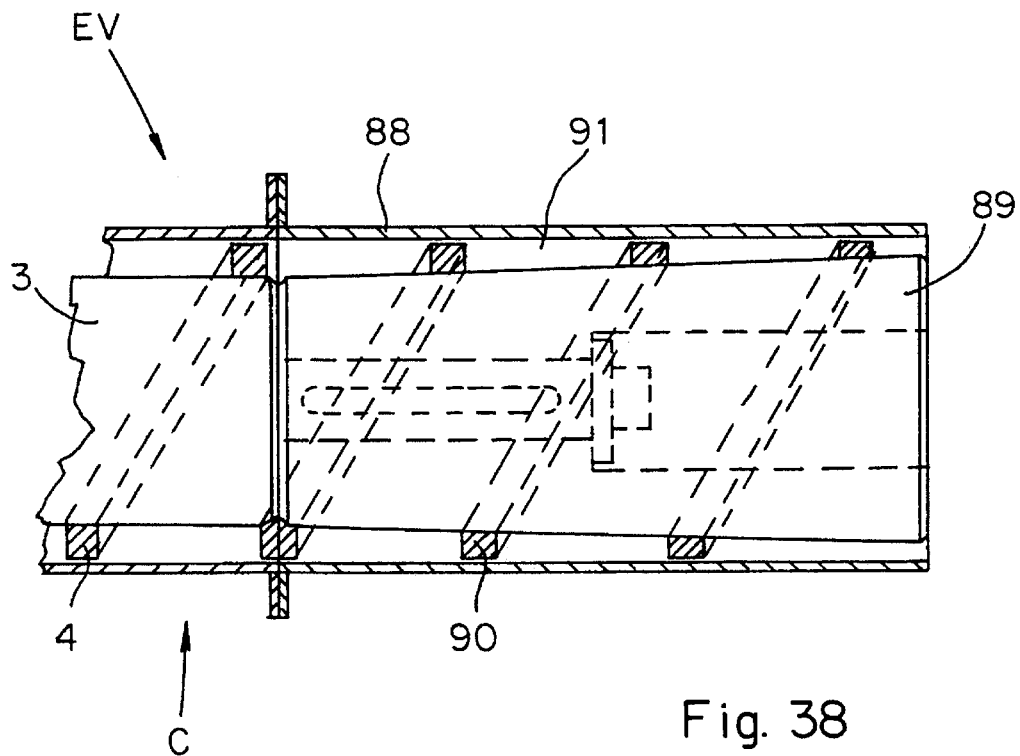
FIG. 38 is the longitudinal vertical section of a compacting element with a diverging tapered thread.

84 are bearings supporting the shaft 78 at the inside of the tubular element 82. 85 (FIG. 35) is a tubular element connected in series with the outlet of the evacuator EV, having the same cross section (if appropriate) as that of the part C of said evacuator, constant or tapering to the front for further compacting of material before injection of the same through the side of the container 45. 86 (FIG. 36) is a tubular elbow element for additional compacting of material before the injection of the same into the container from below. 87 (FIG. 37) is a tubular elbow element for further compacting of the material before injection of the same through a side-wall of the container. 88 (FIG. 38) is a tubular compacting element constituting a continuation of the housing of the part C of the evacuator EV. 89 is a tapered element having its smaller end fixed to the end of the shaft 3: a length of thread 90 is anchored to said element 89; said length of thread havign a section decreasing in the axial travel direction of the material in relation to the decrease of the annular outflow section 91 defined between the tubular element 88 and the tapered element 89.

Figure 39:
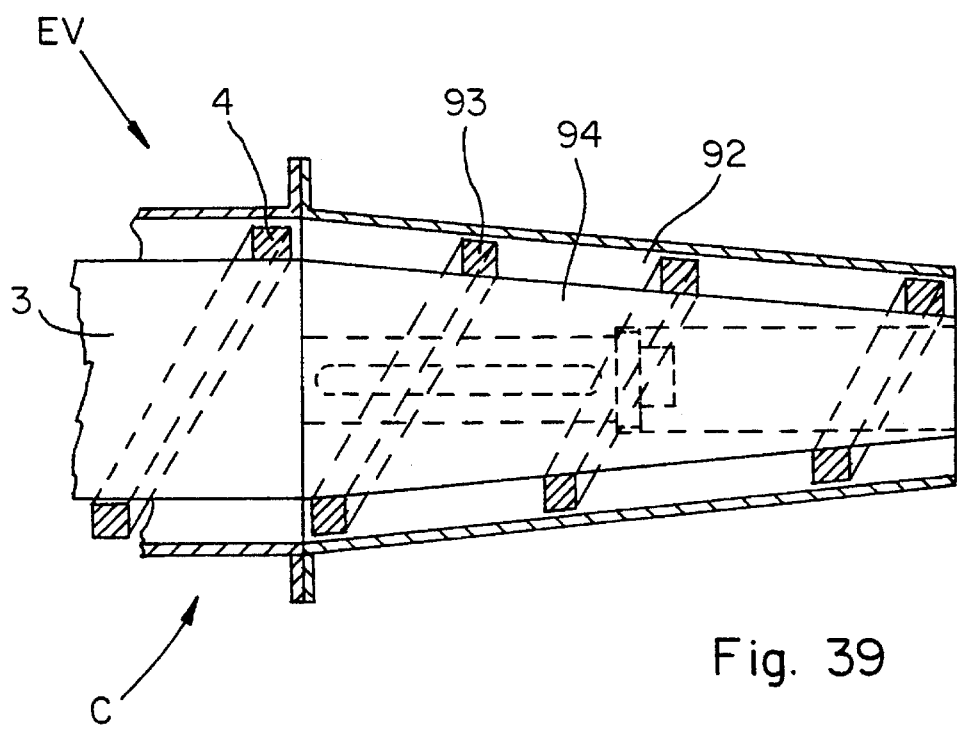
FIG. 39 is the longitudinal vertical section of a compacting element with a converging tapered thread.
Figure 40:
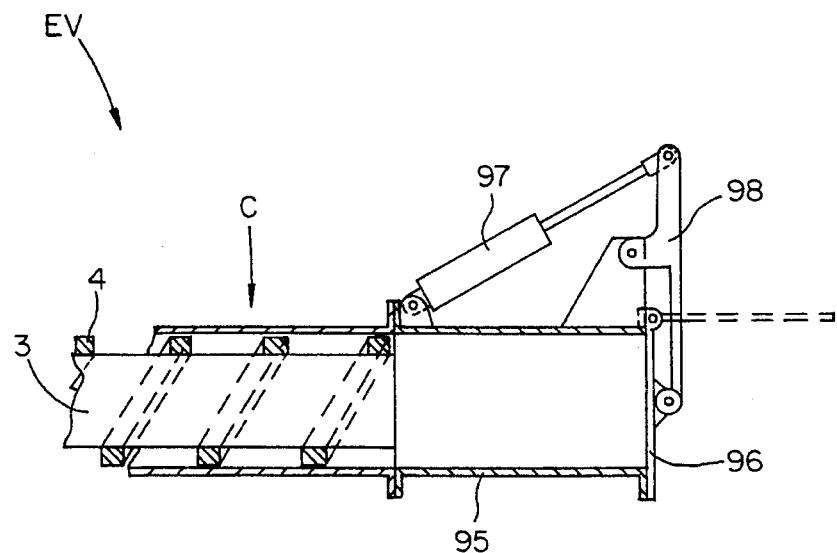
FIG. 40 is the longitudinal vertical section of a cylindrical tubular compacting element with an intermittently operated shut-off device.
Figure 41:
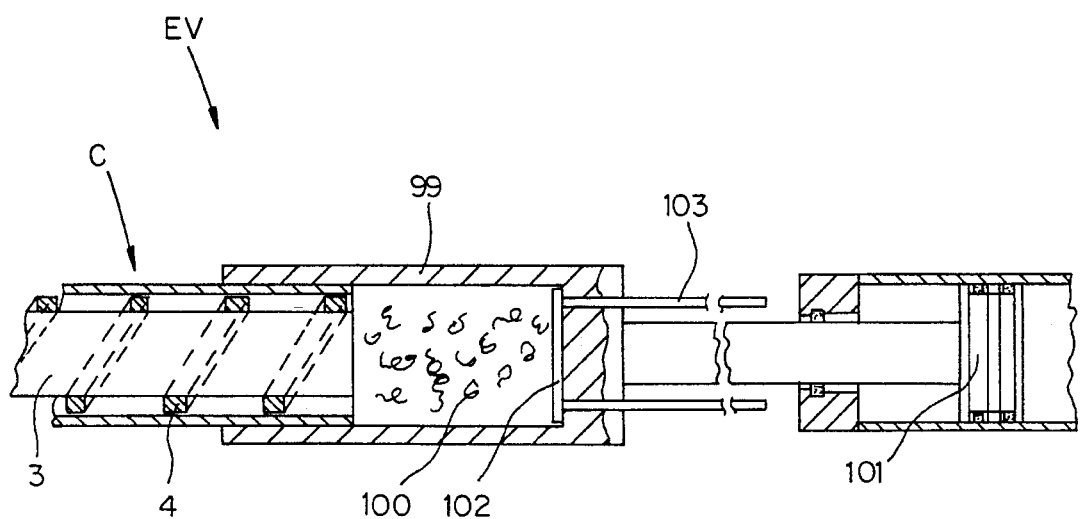
FIG. 41 is the longitudinal vertical section of a compacting element with chamber the volume of which may be axially reduced.
Figure 45:
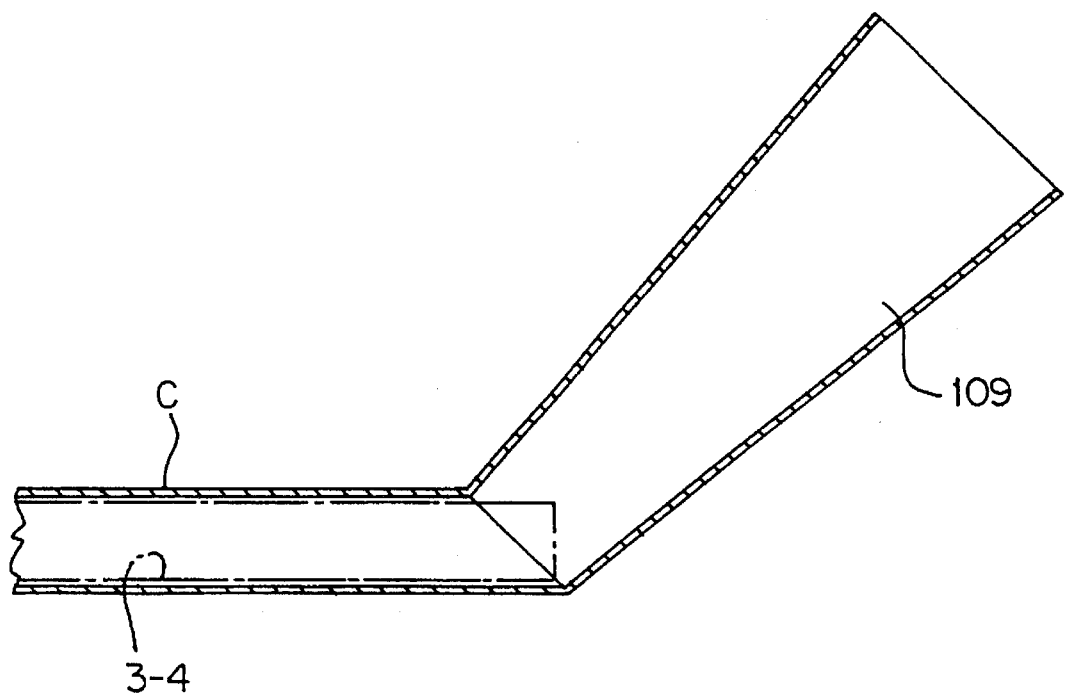
FIGS. 45, 46 (plan), 47, 48 and 49 represent the longitudinal section of the machine's front, or evacuation end, capable in some versions of evacuating shavings at angles of up to 90° to the horizontal axis, for example (but not restricted to) for discharge of shavings into an open container.
Figure 46:
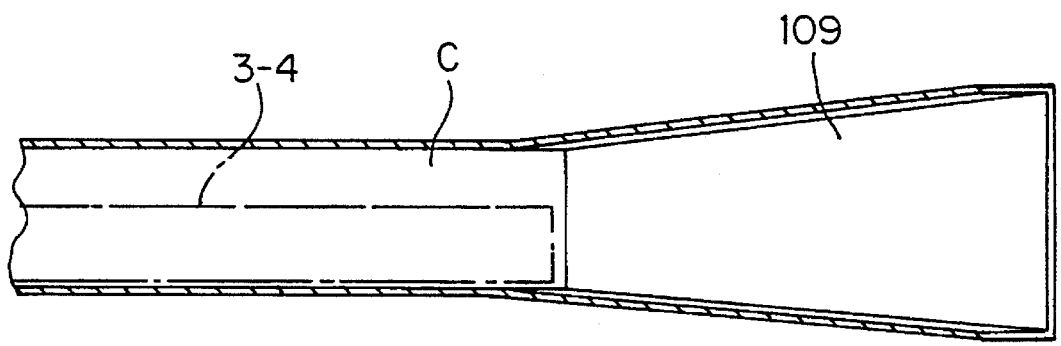
Figure 47:
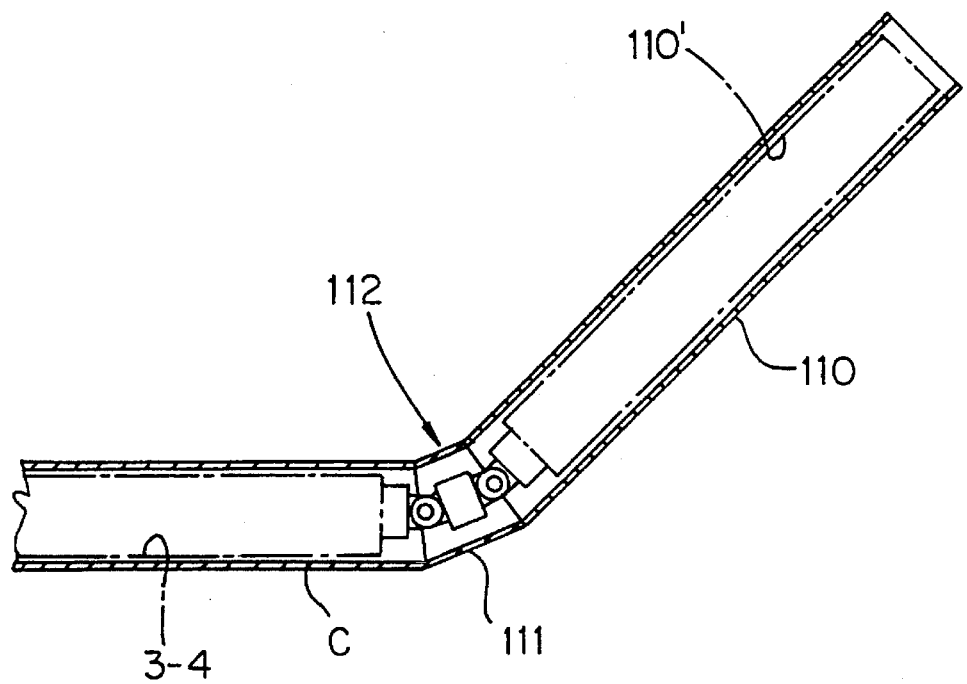
Figure 48:
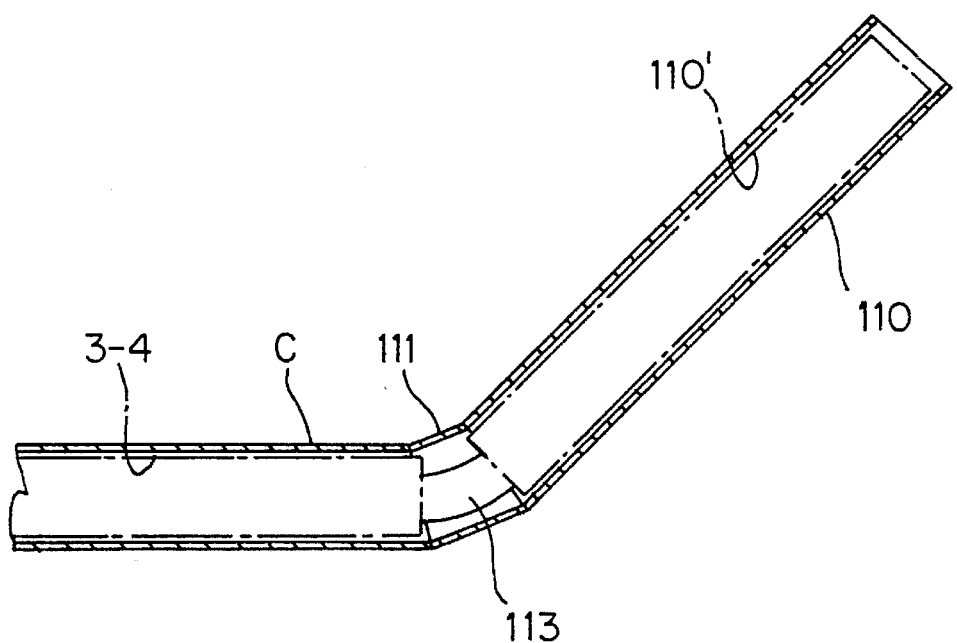
Figure 49:
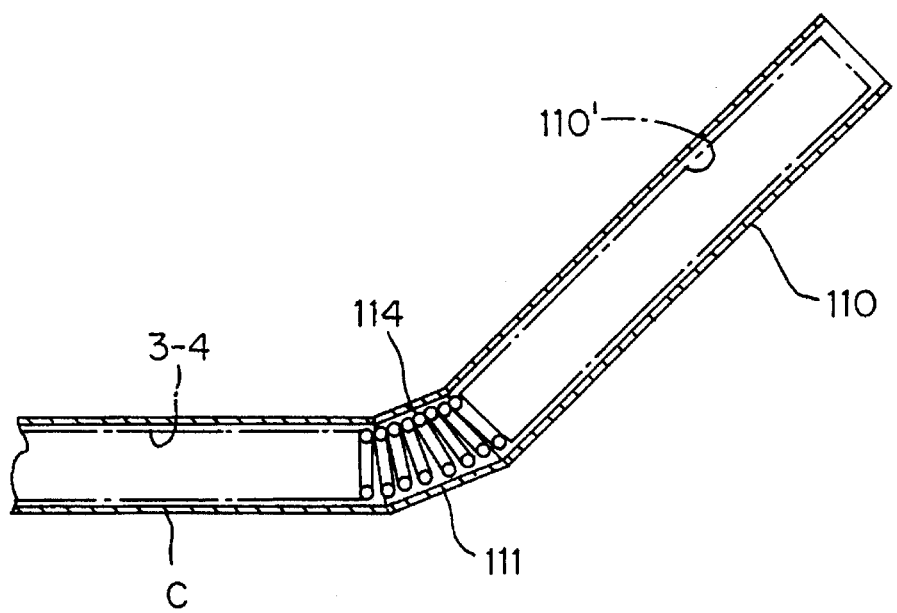
Figure 50:
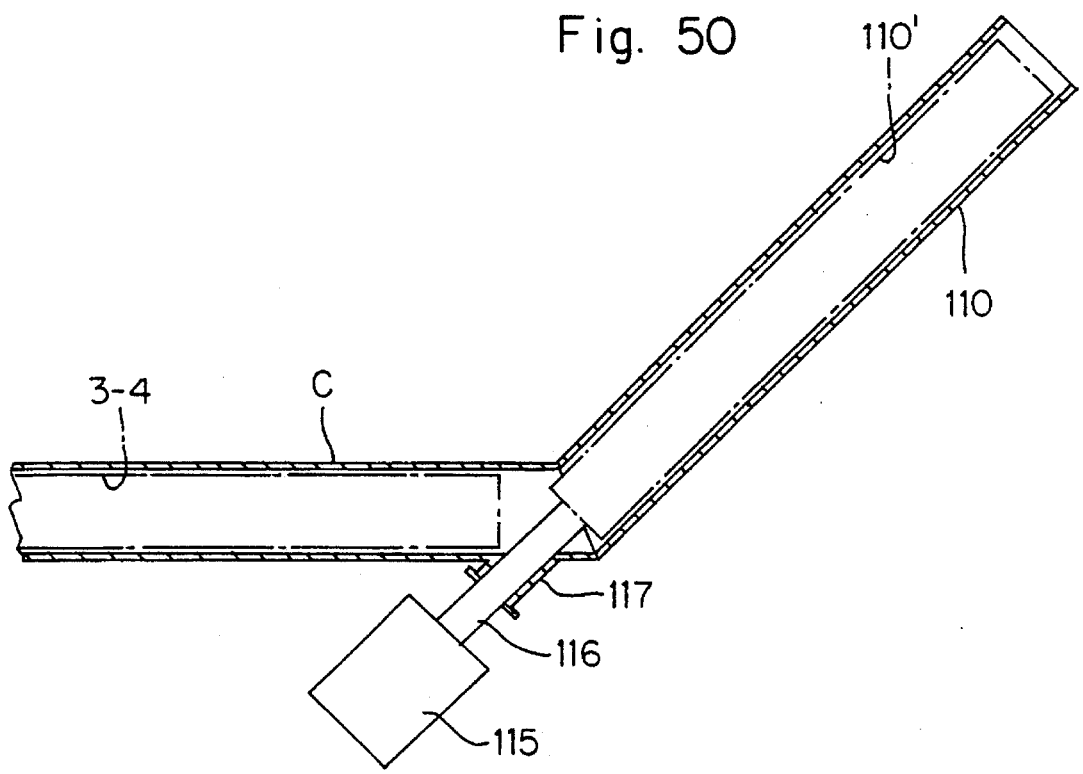
FIG. 50 is the longitudinal section of a possible section of plant, as in FIG. 42, however with conveyor section inclined at less than 90°.

92 (FIG. 39) is a tubular element tapered towards the front constituting continuation of the housing of the part C of the evacuator EV: a tapered thread 93 fixed onto an element 94 tapering towards the front is enclosed in said element 92; the element 94 is fixed to the end of the shaft 3 of the evacuator EV (this is to provide a further compacting of the material). 95 (FIG. 40) is a tubular element constituting a continuation of the housing of the part C of the evacuator EV for further compacting of the material through closure of the mobile shut-off device 96 operated by a cylinder 97 and a lever 98. 99 (FIG. 41) is a cartridge slidably mounted and driven in alternating axial stroke on the outer surface of the tubular element of the part C of the evacuator EV to obtain compressed blocks 100 of discharged material. 101 is a piston providing alternating motion of the cartridge 99. An extractor plate 102, operated by rods 103 in contact with the head of the cylinder of said piston, is provided at the base of said cartridge. 104 (FIG. 42) is an overhead plant embodied according to the invention. 105 is a container into which the compacted material is dropped by gravity. ERT is a sectioning screw-conveyor (if installed) which acts as a connection between two conveyor elements, especially useful in case of obstacles. 106 (FIG. 43) is a baffle directing shavings upwards to prevent the liquid phase from flowing forwards; said baffle is required to drain out the liquid in the middle section through slots 107 defined between the wings 7 and sides 8. Correspondingly, the housing 6 is inclined forward, for instance, at an angle of 1°–2° and the screw 3, 4, inclined forwards and down in relation to said housing, has its front and resting on a replaceable hardened element 108 in order to prevent wear along the housing. 109 (FIG. 45) is a baffle shaped as a truncated-pyramid diverging outwards for free discharge of shavings; 110 (FIG. 47) is an inclined-axis housing of a screw 110' connected, by means of elbow 111, to the housing C of a power-driven screw 3. 112 is a cardan joint providing connection between the two screws; 113 (FIG. 48) is a lenght of a flexible plastic or steel rod to transmit torque from a screw 3 to a screw 110'; 114 (FIG. 49) is a coil spring inserted in an elbow 111 to transmit torque from a screw 3 to a screw 110'; end 115 is a motor-powered inclined-axis screw 110', whose shaft 116 is guided by a tubular element 117 deriving from the housing C of a screw 3.

Note that the elements 109 and 110 may make an angle up to 90° with an horizontal plane: this may either provide access to a free discharge point or provide transfer to a compressed discharge point: in the latter case, a connection to a further housing may also be installed. Note, in addition, that housing 6 may be inclined backwards and downwards, in order to make possible to keep the screw horizontal.

The apparatus operates as follows (FIG. 1). Once the shaft 3 of the screw 4 has been started, the material 9 is fed by gravity onto said screw 4 between sides 8 of the middle section C of an evacuator EV. If said material has a medium or high apparent specific volume, as shavings of medium or long lenght have, it will move forwards, tending in part to "float" above the screw until it meets the funnelling element 12 which favours infeed of materials into the screw housing. The material is then fed on to the lower zones of the conveyor section, moving outside the surface of a theoretical cylinder circumscribed about the thread of the screw, and penetrates, as shown for example in FIG. 4, into the flow ways Q3 and Q4 parallel to the axis of the screw.

The rotation of the screw 4 conveys through the upper part of the conveyor section the material which "floats" in the flow ways Q1 and Q2, especially in the flow way Q1 which offers a greater cross section to the product flow, in relation to the screw rotation direction; this also favors the dispersal of the material which would otherwise tend to be kept stationary by the circular movement of the shaft. As the material gradually enters the flow ways, it meets a resistance against the walls of the same, which tend to brake it.

The other material arriving from behind, pushed forward by the screw thread, exerts a thrust owing to chance interconnections which arise with the material distributed inside the flow ways, said thrust tending to drive the latter material forward against the above mentioned resistance.

The mutual effects generated by said interconnections on the one hand prevent even the most obstinate material from remaining stationary by wrapping round the screw, and on the other hand push the material which has overflowed along the flow ways: the braking effect of the walls of said flow ways compacts the material as it is fed forward, allowing it to be forced out through the discharge outlet 13. The level of compacting obtained can be increased by inserting the compactor devices described previously, which form a part of the plant, downstream of the outlet of the evacuator or conveyor.

Additional compacting is obtained by inserting the outlet of the evacuator EV through a side or front of the container 45, which also forms a part of the apparatus: in the case of machining shavings or swarf in general, the container is installed in relation to the base of the machine tool served by the evacuator, in order to reduce the conveyance distance to a minimum. The injection of material into said container is hindered by the walls of the same, and by the lid (if present), leading to further compacting; injection of material through the base of the container allows the conveyance distance of the material to be reduced at a minimum, when the evacuator is installed inside a trench.

Figure 42:
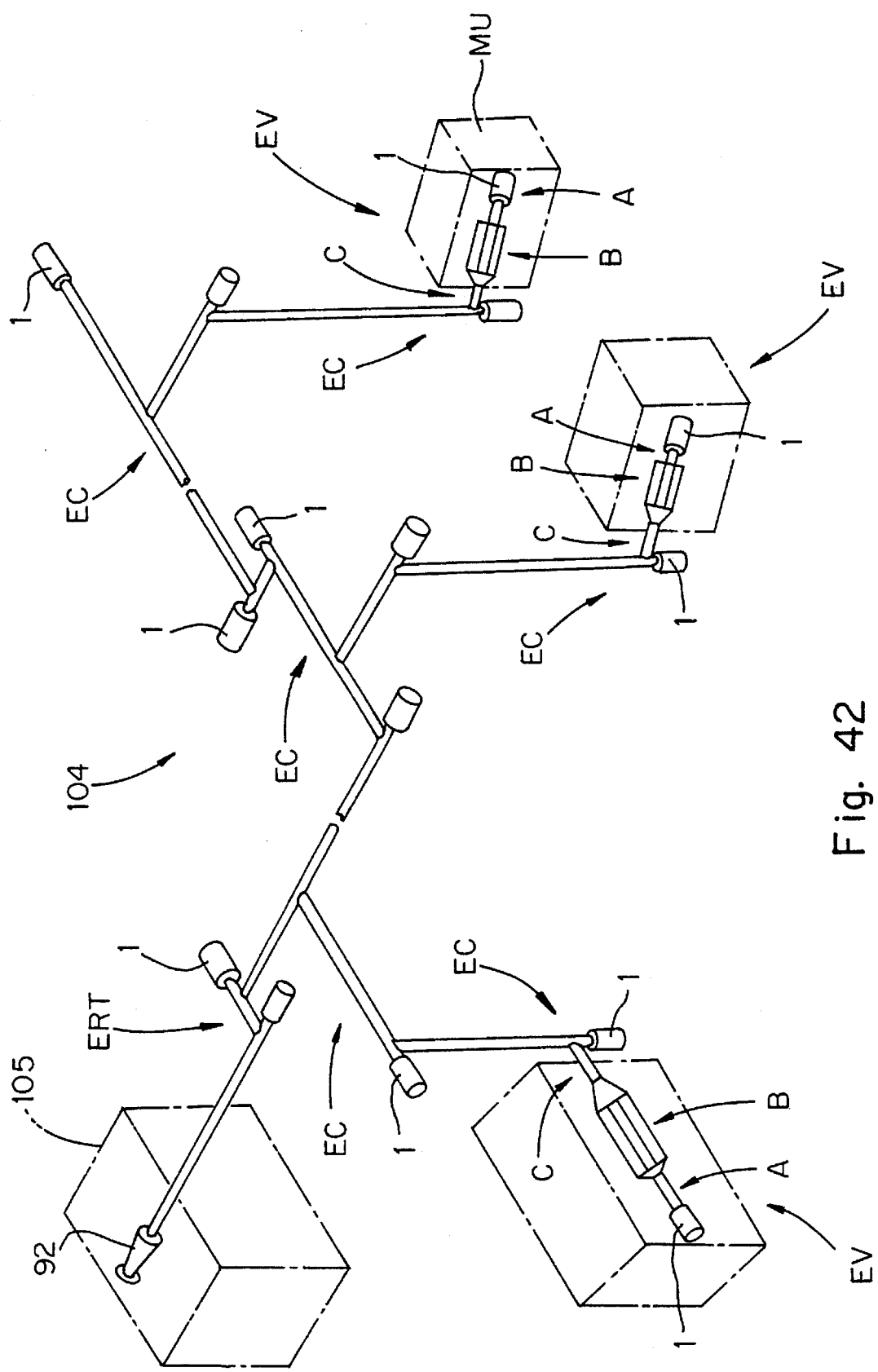
FIG. 42 is a perspective view of the lay-out of an overhead evacuation, conveyor and compacting plant designed in accordance with the invention, using vertical and horizontal conveyors.
Figure 43:
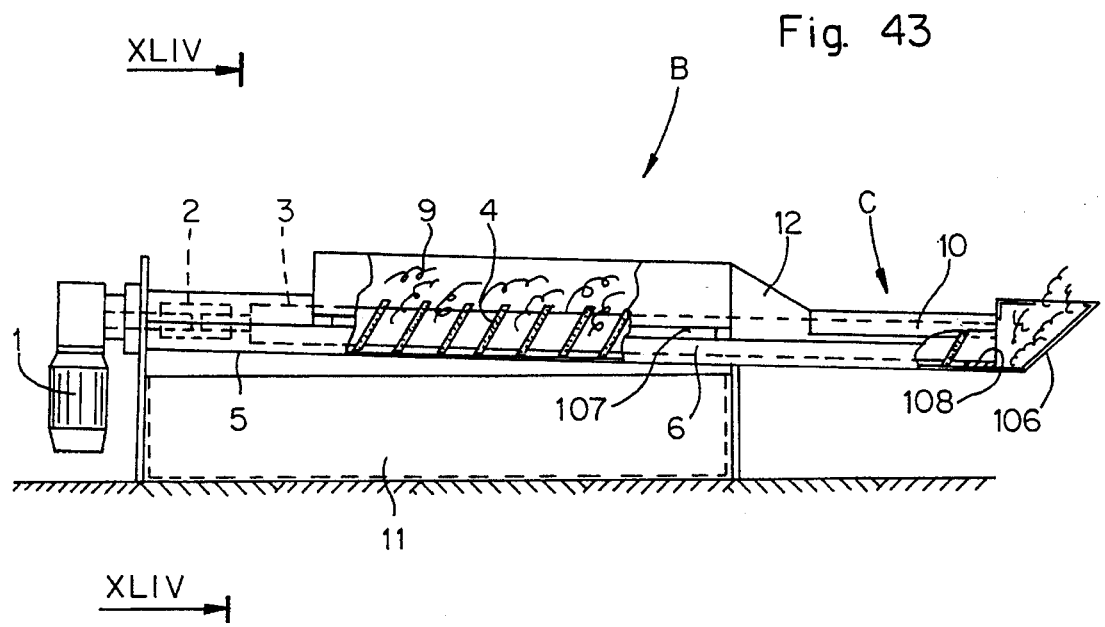
FIG. 43 is a side view similar to that in FIG. 1 showing an especially advantageus version.
Figure 44:
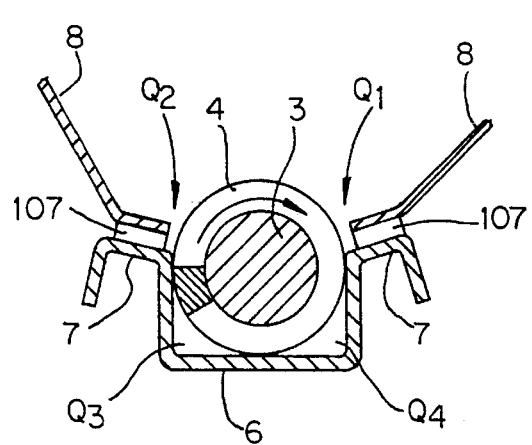
FIG. 44 is the vertical section XLIV—XLIV of FIG. 43.

In the case of FIGS. 5 to 13, referring to the apparatus which may also assume the dimensions of an overhead transport system as indicated in FIG. 42, the angled connections allow the most appropriate route to be selected in any case, making use, downstream of the evacuator, of the action of screw conveyor elements equipped with their own motors which increase the degree of compacting obtained.

The natural chopping which occurs at the connection between the evacuator or conveyor outlet and the housing of the next evacuator or conveyor increases further the degree of compaction.

When putting the invention into effect, the materials, dimensions and details of components may be different from those indicated, but technically equivalent, without therefore failing to fall within the juridical scope of this invention. Thus the longitudinal flow ways, provided outside a theoretical cylinder circumscribed about the screw and appropriately parallel to its axis, may be provided along the evacuator only or may be extended, fully or in part, to one or more of the compactors and/or conveyors which follows, depending on the type of material; moreover the shapes of the sections shown in FIGS. 3 and 4, 14 to 27 and 44 may clearly be varied within the scope of this invention and the lobes indicated as 29 may also be applied to other section shapes in order to obtain flow ways with cross section in the form of arcs of a circle: said lobes may be more or less than four.

Again, the part C of the evacuator could be eliminated or considerably reduced in lenght if the material will nevertheless provide an adequate degree of compacting at the discharge point of the middle section B, or when compacting is not required. Finally, hooks 56–57 could be transferred to a side 46 of a container 5.

In this disclosure, there are shown and described only the preferred embodiments of the invention, but, as aforementioned, it is to be understood that the invention is capable of use in various other combinations and environments and is capable of changes or modifications within the scope of the inventive concept as expressed herein.

I claim:

1. Method for the conveyance, compacting and discharge of bulk compactable materials comprising:

feeding in an inflow of bulk materials onto a screw feeder enclosed in a conveyor tube and driven by a motor, wherein the conveyor screw is rotated within a housing having a front, middle and rear section and the screw axially extends through substantially an entire length of said front, middle and rear section; and providing a plurality of longitudinal flow ways defined between said housing having a non-constant and outside a theoretical cylinder circumscribed about said screw and open toward said cylinder, said flow ways being defined by a housing cross-section and a periphery which is non-concentric with said cylinder.

2. A method, according to claim 1, wherein said conveyor screw exhibits a ratio between the external diameter of screw threads and the diameter of a shaft supporting the same of less than 3 but bigger than 1.

3. The method according to claim 2, wherein:

said ratio is between 1.5 and 2.1.

4. Apparatus for conveying and compacting bulk materials comprising:

a rotatable screw feeder including a screw thread enclosed in a conveyor tube and rotated therein by a motor, the screw feeder being divided into a rear section (A) for transmission of rotary motion to a screw conveyor, a middle section (B) for reception and conveyance of materials to be conveyed, and a front section (C) for conveying, compacting and discharging of the materials, wherein (i) a housing of the screw has a non-circular cross-section to provide more than one longitudinal flow way outside a theoretical cylinder circumscribed about the screw, and with a periphery which is non-concentric with said theoretical cylinder and (ii) the screw axially extends through substantially an entire length of said housing.

5. Apparatus according to claim 4, wherein a ratio of the external diameter of the screw thread and the diameter of a shaft supporting the same is less than 3 but bigger than 1.

6. Apparatus according to claim 4, wherein:

the housing of said front section (C) of said screw feeder has a cross-section presenting at least one point in contact with the screw thread, said screw thread being inclined slightly forward and down, the lower part of the housing of said front section (C) having the same cross-sectional shape as the housing of the middle section (B) and the rear section (A) of the screw feeder, and said front section (C) being connected at the rear and top to the middle section (B) by means of an upper funnelling element.

7. The apparatus according to claim 5, wherein:

said ratio is between 1.5 and 2.1.

8. The apparatus according to claim 4, wherein:

the cross section of the housing of the middle section (B) of the screw feeder has the shape of a squared U with upper wings and the cross-section of the housing of the front section (C) is shaped as an asymmetrical T.

9. The apparatus according to claim 4, wherein:

the cross-section of the housing of the middle section (B) of the screw feeder has the shape of a squared U and the cross-section of the housing of the front section (C) has the shape of a square or rectangle with horizontal base.

10. The apparatus according to claim 4, wherein:

the cross-section of the housing of the middle section (B) of the screw feeder is V-shaped and the cross-section of the housing of the front section (C) has the shape of a square with vertical diagonal.

11. The apparatus according to claim 4, wherein:

the cross-section of the housing of the front section (C) of the screw feeder is circular with a lobed appendix.

12. The apparatus according to claim 4, wherein:

the cross-section of the housing of the middle section (B) of the screw feeder is U-shaped with lobed appendices at its corners and the cross-section of the housing of the front section (C) has the shape of a square with lobed appendices at its corners.

13. The apparatus according to claim 4, wherein:

the cross-section of the housing of the middle section (B) of the screw feeder has a squared U-shape and the cross section of the housing of the front section (C) has the shape of a square, radial horizontal and vertical diaphragms radially adjustable being provided in said housing of the middle and front section of the screw feeder.

14. The apparatus according to claim 4, wherein:

the cross-section of the housing of the middle section (B) of the screw feeder has a square U-shape with upper wings and the housing of the front section (C) has an upper portion in the form of two asymmetrical pitched sections.

15. The apparatus according to claim 4, wherein:

the cross-section of the housing of the middle section (B) of the screw feeder has the shape of an half oval and the housing of the front section (C) has the shape of an oval.

16. The apparatus according to claim 4, wherein:

the cross-section of the housing of the middle section (B) of the screw feeder has a polygonal perimeter and the cross section of the housing of the front section (C) has the shape of a polygon with more than four sides.

17. The apparatus according to claim 4, wherein:

the cross-section of the housing of the middle section (B) of the screw feeder is V-shaped and the cross-section of the housing of the front section (C) is shaped as a triangle with its tip at the bottom.

18. The apparatus according to claim 4, wherein:

the cross-section of the housing of the middle section (B) of the screw feeder has a polygonal perimeter with a longest side at the bottom and the cross-section of the housing of the front section (C) is shaped as a triangle with its tip at the top.

19. Apparatus for conveying and compacting bulk materials comprising:

a rotatable screw feeder including a screw thread enclosed in a conveyor tube and rotated therein by a motor, the screw feeder being divided into a rear section (A) for transmission of rotary motion to a screw conveyor, a middle section (B) for reception and conveyance of materials to be conveyed, and a front section (C) for conveying, compacting and discharging of the materials, wherein (i) a non-circular cross-section of a housing of the screw provides more than one longitudinal flow way outside a theoretical cylinder circumscribed about the screw and with a periphery which is non-concentric with said cylinder, (ii) the screw axially extends through substantially an entire length of said housing, and (iii) a ratio of the external diameter of the screw thread and the diameter of a shaft supporting the same is less than 3 but bigger than 1.

* * * * *